(12) United States Patent
Chang et al.

(10) Patent No.: US 12,438,150 B2
(45) Date of Patent: *Oct. 7, 2025

(54) ANODELESS LITHIUM METAL BATTERY AND METHOD OF MANUFACTURING THE SAME

(71) Applicants: Samsung Electronics Co., Ltd., Suwon-si (KR); Samsung SDI Co., Ltd., Yongin-si (KR)

(72) Inventors: Wonseok Chang, Seoul (KR); Hyorang Kang, Anyang-si (KR); Jirae Kim, Seoul (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/749,355

(22) Filed: May 20, 2022

(65) Prior Publication Data

US 2022/0285720 A1 Sep. 8, 2022

Related U.S. Application Data

(63) Continuation of application No. 16/236,689, filed on Dec. 31, 2018, now Pat. No. 11,355,778.

(30) Foreign Application Priority Data

Jan. 5, 2018 (KR) .................. 10-2018-0001849

(51) Int. Cl.
 H01M 4/38 (2006.01)
 H01M 4/40 (2006.01)
 (Continued)

(52) U.S. Cl.
 CPC .......... *H01M 4/382* (2013.01); *H01M 4/405* (2013.01); *H01M 4/74* (2013.01); *H01M 10/052* (2013.01);
 (Continued)

(58) Field of Classification Search
 CPC ............. H01M 50/457; H01M 50/431; H01M 10/0569; H01M 4/405; H01M 4/382; H01M 10/0562; H01M 4/40
 See application file for complete search history.

(56) References Cited

U.S. PATENT DOCUMENTS 6,402,795 B1 6/2002 Chu et al.
7,901,468 B2 3/2011 Harada et al.
(Continued)

FOREIGN PATENT DOCUMENTS

CN 105390743 A 3/2016
CN 106340651 A 1/2017
(Continued)

OTHER PUBLICATIONS

Kai Yan et al. "Selective deposition and stable encapsulation of lithium through heterogeneous seeded growth", Nature Energy, Feb. 22, 2016, pp. 1-8.
(Continued)

*Primary Examiner* — Laura Weiner
(74) *Attorney, Agent, or Firm* — CANTOR COLBURN LLP

(57) ABSTRACT

An anodeless lithium metal battery includes: a cathode including a cathode current collector and a cathode active material layer on the cathode current collector; an anode current collector on the cathode; a composite electrolyte between the cathode and the anode current collector, wherein the composite electrolyte, wherein the composite electrolyte includes a first liquid electrolyte and a metal
(Continued)

comprising at least one of a lithium metal and a lithium metal alloy; and a liquid-impermeable ion-conductive composite membrane between the cathode and the composite electrolyte.

26 Claims, 6 Drawing Sheets

(51) Int. Cl.
*H01M 4/74* (2006.01)
*H01M 10/052* (2010.01)
*H01M 10/056* (2010.01)
*H01M 10/0562* (2010.01)
*H01M 10/0569* (2010.01)
*H01M 50/414* (2021.01)
*H01M 50/417* (2021.01)
*H01M 50/426* (2021.01)
*H01M 50/449* (2021.01)
*H01M 50/457* (2021.01)

(52) U.S. Cl.
CPC ..... *H01M 10/056* (2013.01); *H01M 10/0562* (2013.01); *H01M 10/0569* (2013.01); *H01M 50/414* (2021.01); *H01M 50/417* (2021.01); *H01M 50/426* (2021.01); *H01M 50/449* (2021.01); *H01M 50/457* (2021.01); *H01M 2300/002* (2013.01); *H01M 2300/0025* (2013.01); *H01M 2300/0068* (2013.01); *H01M 2300/0091* (2013.01); *H01M 2300/0094* (2013.01)

(56) References Cited

U.S. PATENT DOCUMENTS

| | | | |
|---|---|---|---|
| 7,968,233 | B2 | 6/2011 | Nelson et al. |
| 9,093,707 | B2 | 7/2015 | Lee et al. |
| 11,133,532 | B2 * | 9/2021 | Chang .................. H01M 4/382 |
| 11,355,778 | B2 * | 6/2022 | Chang .................. H01M 4/382 |
| 2005/0239917 | A1 | 10/2005 | Nelson et al. |
| 2006/0110661 | A1 | 5/2006 | Lee et al. |
| 2011/0003211 | A1 | 1/2011 | Hudson et al. |
| 2015/0079485 | A1 | 3/2015 | Choi et al. |
| 2016/0064770 | A1 | 3/2016 | Lee et al. |
| 2016/0126543 | A1 | 5/2016 | Ota et al. |
| 2016/0181585 | A1 | 6/2016 | Choi et al. |
| 2016/0261000 | A1 | 9/2016 | Zhang et al. |
| 2016/0351952 | A1 | 12/2016 | Ohtomo et al. |
| 2017/0062829 | A1 | 3/2017 | Ryu et al. |
| 2017/0093002 | A1 | 3/2017 | Choi et al. |
| 2017/0324097 | A1 | 11/2017 | Lee et al. |
| 2018/0040904 | A1 | 2/2018 | Choi et al. |
| 2018/0323467 | A1 | 11/2018 | Tang et al. |
| 2020/0106094 | A1 | 4/2020 | Ota et al. |
| 2021/0083291 | A1 | 3/2021 | Lee et al. |
| 2022/0278357 | A1 | 9/2022 | Chang et al. |

FOREIGN PATENT DOCUMENTS

| | | |
|---|---|---|
| CN | 106486699 A | 3/2017 |
| CN | 110010954 A | 7/2019 |
| CN | 115207519 A | 10/2022 |
| EP | 3136475 A1 | 3/2017 |
| JP | 2000228185 A | 8/2000 |
| JP | 2011065841 A | 3/2011 |
| JP | 2017534164 A | 11/2017 |
| KR | 20010064617 A | 7/2001 |
| KR | 20030095578 A | 12/2003 |
| KR | 0582557 B1 | 5/2006 |
| KR | 20160026648 A | 3/2016 |
| KR | 20170026098 A | 3/2017 |
| KR | 20170124075 A | 11/2017 |
| KR | 20170126404 A | 11/2017 |
| WO | 2017143274 A1 | 8/2017 |
| WO | 2017146357 A1 | 8/2017 |
| WO | 2017214276 A1 | 12/2017 |
| WO | 2018236166 A1 | 12/2018 |
| WO | WO 2018/236166 * | 12/2018 |

OTHER PUBLICATIONS

Mihai Duduta et al., "Semi-Solid Lithium Rechargeable Flow Battery", Advanced Energy Materials, May 20, 2011, pp. 511-516, vol. 1.
Japanese Office Action for Japanese Patent Application No. 2018-247277 dated Dec. 23, 2022.
English Translation of Office Action dated Nov. 16, 2023, issued in corresponding CN Patent Application No. 201910006997.4, 6 pp.
English Translation of Office Action dated Nov. 17, 2023, issued in corresponding CN Patent Application No. 201910006968.8, 7 pp.
Office Action dated Nov. 16, 2023, issued in corresponding CN Patent Application No. 201910006997.4, 6 pp.
Office Action dated Nov. 17, 2023, issued in corresponding CN Patent Application No. 201910006968.8, 6 pp.
Office Action for U.S. Appl. No. 17/749,372 dated May 31, 2024.

* cited by examiner

ANODELESS LITHIUM METAL BATTERY AND METHOD OF MANUFACTURING THE SAME

CROSS-REFERENCE TO RELATED APPLICATION

This application is a continuation of U.S. patent application Ser. No. 16/236,689, filed on Dec. 31, 2018, and patented as U.S. Pat. No. 11,355,778 on Jun. 7, 2022, which claims priority to and the benefit of Korean Patent Application No. 10-2018-0001849, filed on Jan 5, 2018, in the Korean Intellectual Property Office, and all the benefits accruing therefrom under 35 U.S.C. § 119, the contents of which are incorporated herein by reference in their entirety.

BACKGROUND

1. Field

The present disclosure relates to an anodeless lithium metal battery and a method of manufacturing the same.

2. Description of the Related Art

A lithium secondary battery is a high-performance battery having the highest energy density as compared to other currently available secondary batteries, and is applicable to various fields, such as electric vehicles.

A lithium secondary battery may use a lithium metal thin film as an anode. A lithium metal thin film may be formed by roll-pressing lithium into a planar form. However, a lithium secondary battery using a lithium thin film as the anode may have insufficient energy density and lifetime characteristics due to the formation and growth of dendrites on the lithium metal thin film. Therefore, there is a need for an improved anode material.

SUMMARY

Provided is an anodeless lithium metal battery.

Provided is a method of manufacturing the anodeless lithium metal battery.

Additional aspects will be set forth in part in the description which follows and, in part, will be apparent from the description, or may be learned by practice of the presented embodiments.

According to an aspect of an embodiment, an anodeless lithium metal battery includes: a cathode including a cathode current collector and a cathode active material layer on the cathode current collector; an anode current collector on the cathode; a composite electrolyte between the cathode and the anode current collector, wherein the composite electrolyte includes a first liquid electrolyte and a metal including at least one of a lithium metal or a lithium alloy; and a liquid-impermeable ion-conductive composite membrane between the cathode and the composite electrolyte.

According to an aspect of another embodiment, a method of manufacturing the anodeless lithium metal battery includes: combining the metal including at least one of lithium metal or a lithium metal alloy with the first liquid electrolyte to prepare a composite electrolyte composition; coating the composite electrolyte composition on the anode current collector to form a coated composite electrolyte; drying the coated composite electrode to prepare the composite electrolyte; and disposing the anode current collector and the composite electrolyte on the liquid-impermeable ion-conductive composite membrane and the cathode current collector to thereby form the anodeless lithium metal battery.

BRIEF DESCRIPTION OF THE DRAWINGS

These and/or other aspects will become apparent and more readily appreciated from the following description of the embodiments, taken in conjunction with the accompanying drawings in which:

FIG. 4B is a graph of coulombic efficiency (%) versus number of cycles (n) in an anodeless lithium metal battery manufactured in accordance with Comparative Example 2;

DETAILED DESCRIPTION

Figure 1A:
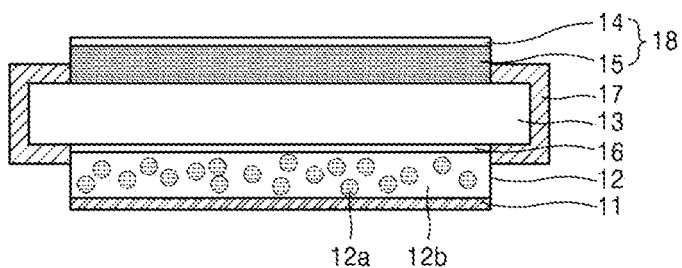
FIG. 1A is a schematic view illustrating a structure of an embodiment of an anodeless lithium metal battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." As used herein, the term "and/or" includes any and all combinations of one or more of the associated listed items. Expressions such as "at least one of," when preceding a list of elements, modify the entire list of elements and do not modify the individual elements of the list.

As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, an embodiment of an anodeless lithium metal battery and a method of manufacturing the anodeless lithium metal battery will be described in greater detail.

In accordance with an aspect of the disclosure, an anodeless lithium metal battery includes: a cathode including a cathode current collector and a cathode active material layer on the cathode current collector; an anode current collector; a composite electrolyte including a first liquid electrolyte and a metal including at least one of a lithium metal and a lithium metal alloy; and a liquid-impermeable ion-conductive composite membrane between the cathode and the composite electrolyte.

In a lithium metal battery using a lithium metal thin film as an anode, a dead volume of lithium may be generated in the battery due to a lithium dendrite on the lithium metal thin film. While not wanting to be bound by theory, it is understood that the dendrite forms and grows during charge and discharge. The formation of the lithium dendrite is understood to lead to loss of electrochemically active lithium, and consequently reducing the lifetime and capacity characteristics of the lithium metal battery. In addition, because the lithium metal thin film is in a planar form, the lithium metal thin film may swell only in an upper or lower portion of the electrode during charging. As a result, it may be difficult to control the volume expansion of the lithium metal battery during charge and discharge within a desired range.

To solve this problem, the inventors have advantageously discovered that use of an anode current collector, without a planar lithium metal thin film, together with a composite electrolyte including a metal including at least one of a lithium metal and a lithium metal alloy and a liquid electrolyte, results in improved energy density and charge-discharge efficiency of a lithium metal battery. While not wanting to be bound by theory, it is understood that in the lithium metal battery according to an embodiment, an individual metal particle of the lithium metal or lithium metal alloy in the composite electrolyte may freely expand, so that the above-described drawbacks associated with the lithium metal battery including a lithium thin film are avoided.

As used herein, the term "liquid-impermeable ion-conductive composite membrane" refers to a composite membrane having ionic conductivity and through which liquid does not pass or permeate. When the liquid-impermeable ion-conductive composite membrane is disposed between the composite electrolyte and the cathode in the anodeless lithium metal battery, the cathode and the composite electrolyte may be both physically and chemically separated from one another, and thus the liquid-impermeable ion-conductive composite membrane effectively forms separate compartments within the electrochemical cell. A different electrolyte may be used in each of the respective compartments and the electrolyte in each compartment may be individually selected. Due to the use of the individually selected electrolytes, electrochemical disadvantages such as high-voltage oxidation, and electrolyte loss due to dendrite growth, may be compensated for. As compared to a lithium metal battery which includes a single electrolyte for both the cathode and the anode, a relatively wide potential window for electrochemical oxidation and reduction may be implemented, and lifetime characteristics of the lithium metal battery may be improved.

As used herein, the term "anodeless lithium metal battery" refers to a lithium metal battery which does not include an anode active material on the anode current collector before the first charge. As is known in the art and used herein, an anodeless battery has no anode as manufactured, although an anode can be present after the first charge cycle. In further detail, the disclosed anodeless lithium metal battery i) does not include an anode active material, such as graphite, that would intercalate and deintercalate lithium ions, ii) has, on an anode current collector when the battery is assembled or after a first charge, a lithium metal thin film or a lithium alloy thin film as an anode having a thickness of about 10% or less with respect to a thickness of a cathode, and iii) does not include an anode active material layer when the battery is assembled and before the first charge. The expression "thickness of the anode" may refer to a total combined thickness of the anode current collector and the anode active material layer. Thus while the anodeless lithium metal battery has a negative electrode, the term "anodeless" is used because when manufactured a distinct anode active material is not present in the lithium metal battery.

The liquid-impermeable ion-conductive composite membrane may include at least one of, for example, a solid ionic conductor or a composite including a solid ionic conductor and a non-ionic conductor.

The solid ionic conductor may be at least one of $Li_{1+x}Ti_{2-x}Al_x(PO_4)_3$ (LTAP) (wherein $0 \leq x < 4$), a material comprising Li, Ge, P, and S, $Li_{1+x+y}Al_xTi_{2-x}Si_yP_{3-y}O_{12}$ (wherein $0 < x < 2$ and $0 \leq y < 3$), $BaTiO_3$, $Pb(Zr_{1-x}Ti_x)O_3$ wherein $0 \leq x \leq 1$ (PZT), $Pb_{1-x}La_xZr_{1-y}Ti_yO_3$ (PLZT) (wherein $0 \leq x < 1$ and $0 \leq y < 1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$ wherein $0 < x < 2$, and $0 < y < 3$), lithium aluminum titanium phosphate ($Li_xAl_yTi_z(PO_4)_3$ wherein $0 < x < 2$, $0 < y < 1$, and $0 < z < 3$), $Li_{1+x+y}(Al_{1-a}Ga_a)_x(Ti_{1-b}Ge_b)_{2-x}Si_yP_{3-y}O_{12}$ (wherein $0 \leq x \leq 1$, $0 \leq y \leq 1$, $0 \leq a \leq 1$, $0 \leq b \leq 1$), lithium lanthanum titanate ($Li_xLa_yTiO_3$, wherein $0 < x < 2$ and $0 < y < 3$), lithium germanium thiophosphate ($Li_xGe_yP_zS_w$ wherein $0 < x < 4$, $0 < y < 1$, $0 < z < 1$, and $0 < w < 5$), lithium nitride ($Li_xN_y$, wherein $0 < x < 4$ and $0 < y < 2$), a $SiS_2$ glass ($Li_xSi_yS_z$ wherein $0 < x < 3$, $0 < y < 2$, and $0 < z < 4$), a $P_2S_5$ glass ($Li_xP_yS_z$ wherein $0 < x < 3$, $0 < y < 3$, and $0 < z < 7$), $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, or a garnet ceramic such as $Li_{3+x}La_3M_2O_{12}$, wherein $0 \leq x \leq 5$ and M is Te, Nb, or Zr.

The solid ionic conductor may include, for example, at least one of $Li_{1.4}Ti_{1.6}Al_{0.4}P_3O_{12}$, $Li_{1.3}Ti_{1.7}Al_{0.3}P_3O_{12}$, $Li_{10}GeP_2S_{12}$, $Li_7La_3Zr_2O_{12}$ (LLZ), lithium phosphorousoxynitride (LiPON), $Li_5La_3Ta_2O_{12}$, $Li_{0.33}La_{0.55}TiO_3$, $Li_{1.5}Al_{0.5}Ge_{1.5}P_3O_{12}$, $Li_3BO_3$, $Li_4SiO_4$—$Li_3PO_4$, $Li_4SiO_4$, $Li_{1/3}La_{1/3}TiO_3$, or $Li_2O$—$Al_2O_3$—$SiO_2$—$P_2O_5$—$TiO_2$—$GeO_2$.

The non-ionic conductor may comprise, for example, a polymer. For example, the polymer may include at least of polyvinyl alcohol, polyacrylonitrile, polyimide, epoxy resin, an acrylic resin, polyethylene, polyethylene oxide, polyvinylidene fluoride, polyvinylpyrrolidone, polyvinyl alcohol, poly 2-vinylpyridine, polytetrafluoroethylene, a tetrafluoroethylene-hexafluoropropylene copolymer, polychlorotrifluoroethylene, a perfluoroalkoxy copolymer, polyethylene oxide diacrylate, polyethylene oxide dimethacrylate, polypropylene oxide diacrylate, polypropylene oxide dimethacrylate, polymethyleneoxide diacrylate, polymethyleneoxide dimethacrylate, poly(C1-C5 alkyldiol) diacrylate, poly(C1-C5 alkyldiol) dimethacrylate, polydivinylbenzene, polyether, polycarbonate, polyamide, polyester, polyvinyl chloride, polyimide, polycarboxylic acid, polysulfonic acid, polysulfone, polystyrene, polyethylene, polypropylene, poly(p-phenylene), polyacetylene, poly(p-phenylene vinylene), polyaniline, polypyrrole, polythiophene, polyacene, poly(naphthalene-2,6-diyl), polyethylene oxide, polypropylene oxide, a vinylidene fluoride-hexafluoropropylene copolymer, poly(vinyl acetate), poly(vinyl butyral-co-vinyl alcohol-co-vinyl acetate), poly(methyl methacrylate-co-ethyl acrylate), polyvinyl chloride-co-vinyl acetate, poly(1-vinyl pyrrolidone-co-vinyl acetate), polyacrylate, polymethacrylate, polyurethane, polyvinyl ether, an acrylonitrile-butadiene rubber, a styrene-butadiene rubber, an acrylonitrile-butadiene-styrene rubber, a sulfonated styrene/ethylene-butylene triblock copolymer, a polymer obtained from at least one acrylate monomer selected from ethoxylated neopentyl glycol diacrylate, ethoxylated bisphenol A diacrylate, ethoxylated aliphatic urethane acrylate, ethoxylated C1-C5 alkylphenol acrylate, or a C1-C5 alkyl acrylate.

The liquid-impermeable ion-conductive composite membrane may be a composite membrane including an organic membrane including a plurality of through holes, and a plurality of ion-conductive inorganic particles in the plurality of through holes. For example, a composite membrane disclosed in US 2015/0079485-A1, US 2016/0181585-A1, US 2017/0093002-A1, and US-2018-0040904-A1, each of which is incorporated herein by reference in its entirety, may be used as the liquid-impermeable ion-conductive composite membrane.

In the liquid-impermeable ion-conductive composite membrane, an amount of the polymer may be about 25 parts by weight to about 100 parts by weight, or about 50 parts by weight to about 80 parts by weight, about 50 parts by weight to about 75 parts by weight, or about 55 parts by weight to about 70 parts by weight, with respect to 100 parts by weight of a total weight of the composite membrane. For example, the polymer may include at least one of polyvinyl alcohol, polyacrylonitrile, polyimide, epoxy resin, an acrylic resin, or polyethylene. The liquid-impermeable ion-conductive composite membrane may be a composite membrane including LTAP and polyvinyl alcohol, or a composite membrane including LTAP and an epoxy resin. For example, LTAP may be a lithium aluminum titanium phosphate ($Li_xAl_yTi_z(PO_4)_3$, wherein $0 < x < 2$, $0 < y < 1$, and $0 < z < 3$), such as $Li_{1.4}Ti_{1.6}Al_{0.4}P_3O_{12}$, or $Li_{1.3}Ti_{1.7}Al_{0.3}P_3O_{12}$.

The liquid-impermeable ion-conductive composite membrane may have a thickness of about 10 micrometers (μm) to about 150 μm, and in an embodiment, about 15 μm to about 90 μm, or about 20 μm to about 50 μm.

An anodeless lithium metal battery according to an embodiment and a composite electrolyte of the anodeless lithium metal battery will be described with reference to FIGS. 1A and 1B. In particular, FIG. 1A is a schematic view illustrating a structure of an anodeless lithium metal battery and FIG. 1B is an illustration showing the structures of a liquid-impermeable ion-conductive composite membrane, a composite electrolyte, and an anode current collector in the anodeless lithium metal battery of FIG. 1A.

Referring to FIG. 1A, the anodeless lithium metal battery according to an embodiment may have a structure including a composite electrolyte 12 on an anode current collector 11. As noted above, a planar lithium metal thin film is not used in the manufacture of the anodeless lithium metal battery. The composite electrolyte 12 includes a metal, e.g., a metal particle 12a, including at least one of lithium metal and a lithium metal alloy dispersed in a first liquid electrolyte 12b.

Figure 1B:
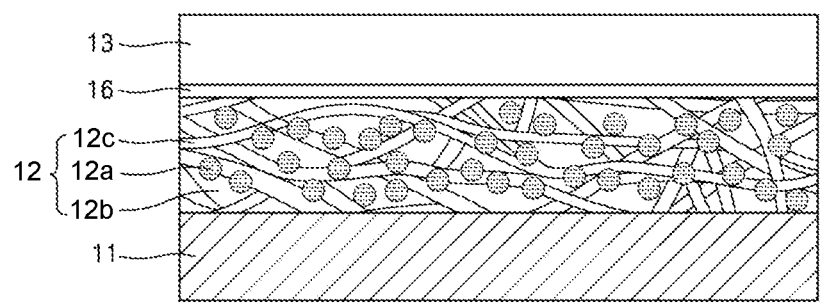
FIG. 1B illustrates structures of an embodiment of a liquid-impermeable ion-conductive composite membrane, a composite electrolyte, and an anode current collector) in the anodeless lithium metal battery of FIG. 1A.

The composite electrolyte 12 may further include a non-woven fabric 12c, as illustrated in FIG. 1B. The non-woven fabric 12c may support the metal particle 12a of a lithium metal and/or a lithium metal alloy. The non-woven fabric 12c may be omitted. For example, when the anode current collector 11 is a mesh type, the non-woven fabric 12c may not be present.

The first liquid electrolyte 12b may be uniformly distributed in the composite electrolyte 12. The first liquid electrolyte 12b may include a lithium salt and a first organic solvent. The first liquid electrolyte 12b may be, for example, an electrolyte solution having a high concentration of the lithium salt. For example, the high-concentration electrolyte solution may be an electrolyte solution containing a lithium salt in a concentration of about 1 molar (M) to about 8 M, and in some embodiments, about 2 M to about 5M, and in some other embodiments, about 2 M to 4 M.

Referring to FIG. 1A, a cathode 18 may include a cathode current collector 14 and a cathode active material layer 15 disposed on the cathode current collector 14. The cathode active material layer 15 may include a cathode active material and a second liquid electrolyte. A liquid-impermeable ion-conductive composite membrane 13 may be disposed between the cathode 18 and the composite electrolyte 12 such that the cathode 18 and the composite electrolyte 12 are separated from one another. The liquid-impermeable ion-conductive composite membrane 13 may prevent the second liquid electrolyte in the cathode 18 from migrating toward the composite electrolyte 12, and may also prevent the first liquid electrolyte in the composite electrolyte 12 from migrating toward the cathode 18.

A porous polymer membrane 16 may be disposed between the liquid-impermeable ion-conductive composite membrane 13 and the composite electrolyte 12 such that direct contact between the liquid-impermeable ion-conductive composite membrane 13 and the composite electrolyte 12 is prevented. Although illustrated in both of FIGS. 1A and 1B, the porous membrane 16 may be omitted. Referring to FIG. 1A, a barrier 17 for protecting the ion-conductive composite membrane 13 may be included. The barrier 17 may have any suitable structure, not limited to the structure of FIG. 1A, provided that it sufficiently protects the liquid-impermeable ion-conductive composite membrane 12. The barrier 17 may include, for example, a material of a battery case, e.g., a metallized film as used for a case of a pouch cell.

The non-woven fabric 12c of FIG. 1B may have a porosity of about 10 volume percent (vol. %) to about 90 vol. %, and in some embodiments, about 10 vol. % to about 80 vol. %, and in some other embodiments, about 10 vol. % to about 50 vol. %, and in some other embodiments, about 25 vol. % to about 50 vol. %, and may have an average pore size of about 0.1 μm to about 10 μm, and in some embodiments, about 0.1 μm to about 8 μm, and in some other embodiments, about 0.1 μm to about 1.0 μm. The non-woven fabric 12c may be a non-woven fabric including at least one of cellulose, polyester, for example, polyethylene terephthalate (PET), polybutylene terephthalate (PBT), or polyethylene naphthalate (PEN), polyetherimide, polyethylene, polypropylene, polyamide, polyacetal, polycarbonate, polyimide, polyether ketone, polyether sulfone, polyphenylene oxide, polyphenylene sulfide, polyethylene naphthalate, polytetrafluoroethylene, polyvinylidene fluoride, polyvinyl chloride, polyacrylonitrile, nylon, or polyparaphenylene benzobisoxazole.

The porous polymer membrane 16 may have a thickness of about 5 μm to about 30 μm, or about 5 μm to about 25 μm, and in some embodiments, about 10 μm to about 20 μm. The porous polymer membrane 16 may include at least one of a polyethylene membrane, a polypropylene membrane, a polyester membrane such as a polyethylene terephthalate membrane, a polybutylene terephthalate membrane, or a polyethylene naphthalate membrane, a polyacetal membrane, a polyamide membrane, a polycarbonate membrane, a polyimide membrane, a polyether ketone membrane, a polyether sulfone membrane, a polyphenylene oxide membrane, a polyphenylene sulfide membrane, or a polyethylene naphthalate membrane.

Figure 1C:
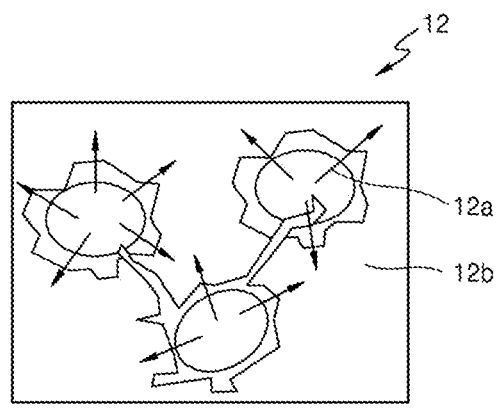
FIG. 1C illustrates a detailed structure of an embodiment of a lithium metal particle in a composite electrolyte, and illustrates an expansion mechanism of the lithium metal particle in the composite electrolyte.

FIG. 1C is an illustration of a detailed structure of a metal particle 12a in a composite electrolyte 12 according to an embodiment, for explaining an expansion mechanism of the metal particle in the composite electrolyte. Referring to FIG. 1C, in the lithium metal battery according to an embodiment, the metal particle 12a of the at least one of lithium metal and a lithium metal alloy in the composite electrolyte 12 including the first liquid electrolyte 12b may be present in the form of an independent metal particle and thus may freely expand in a radial direction, thereby preventing the loss of lithium during charge and discharge.

In a lithium metal battery including a lithium metal thin film, electrodeposition of lithium ions occurs on the lithium metal thin film during charge. However, and without being limited by theory, it is believed that in the lithium metal battery, the composite electrolyte 12 may release a lithium ion during discharge, and the lithium ion may migrate to the metal particle 12a in the composite electrolyte 12 during charge, and then be electrodeposited on a surface of the metal particle 12a. Through these processes the metal particle may form an interconnected structure, and this interconnected structure may be bound to and/or disposed on a surface of the anode current collector 11.

In an embodiment, the first liquid electrolyte of the composite electrolyte and the second liquid electrolyte of the cathode may be different from one another. When the compositions of the first liquid electrolyte and the second liquid electrolyte are different from each other, the compositions of the first and second liquid electrolytes may be independently selected, e.g., to compensate for any electrochemical disadvantage of the anodeless lithium metal battery, such as high-voltage oxidation and electrolyte loss due to dendrite growth.

The first liquid electrolyte and the second liquid electrolyte may each independently include a lithium salt and an organic solvent. The first liquid electrolyte and the second liquid electrolyte may each further include at least one of an ionic liquid and a polymer ionic liquid (PIL).

The ionic liquid may independently be any ionic material in a molten state at room temperature (25° C.), and which includes a cation and an anion. For example, the ionic liquid may include a cation including at least one of an imidazolium cation, an ammonium cation, a pyrrolidinium cation, or a piperidinium cation. However, embodiments are not limited thereto. For example, the ionic liquid may include an anion including at least one of bis(fluorosulfonyl)imide, bis(trifluoromethanesulfonyl)imide fluoroborate, or fluorophosphate. However, embodiments are not limited thereto. Non-limiting examples of the cation include a cation of alkyl ammonium such as triethyl ammonium, a cation of imidazolium such as ethyl methyl imidazolium or butyl methyl imidazolium, a cation of pyrrolidium such as 1-methyl-1-propylpyrrolidium, or the cation methyl propylpiperidium. A combination comprising at least one of the foregoing cations may also be used. Non-limiting examples of the anion are an anion of bis(trifluoromethylsulfonyl)imide (TFSI), bis(pentafluoroethylsufonyl)imide (BETI), tetrafluoroborate ($BF_4$), orhexafluorophosphate ($PF_6$).

The ionic liquid may include, for example, at least one of [emim]Cl/$AlCl_3$ (wherein emim is ethyl methyl imidazolium), [bmpyr]$NTf_2$ (wherein bmpyr is butyl methyl pyridinium and $NTf_2$ is bis(trifluoromethanesulfonyl)imide), [bpy]Br/$AlCl_3$ (wherein bpy is 4,4'-bipyridine), [choline]Cl/$CrCl_3.6H_2O$, [choline]Cl/$HOCH_2CH_2OH$, [$Et_2MeN$($CH_2CH_2OMe$)]$BF_4$ (wherein Et is ethyl, Me is methyl, Pr is propyl, Bu is butyl, Ph is phenyl, Oct is octyl, and Hex is hexyl), [$Bu_3PCH_2CH_2C_8F_{17}$]OTf (wherein OTf is trifluoromethane sulfonate), [bmim]$PF_6$ (wherein bmim is butyl methyl imidazolium), [bmim]$BF_4$, [omim]$PF_6$ (wherein omim is octyl methyl imidazolium), [$Oct_3PC_{18}H_{37}$]I, [NC($CH_2$)$_3$mim]$NTf_2$ (wherein mim is methyl imidazolium), [$Pr_4$N][B(CN)$_4$], [bmim]$NTf_2$, [bmim]Cl, [bmim][Me (OCH$_2$CH$_2$)$_2$OSO$_3$], [PhCH$_2$mim]OTf, [Me$_3$NCH(Me)CH(OH)Ph]NTf$_2$, [pmim][(HO)$_2$PO$_2$] (wherein pmim is propyl methyl imidazolium), [(6-Me)bquin]NTf$_2$ (wherein bquin is butyl quinolinium), [bmim][Cu$_2$Cl$_3$], [C$_{18}$H$_{37}$OCH$_2$mim]BF$_4$ (wherein mim is methyl imidazolium), [heim]PF$_6$ (wherein heim is hexyl ethyl imidazolium), [mim(CH$_2$CH$_2$O)$_2$CH$_2$CH$_2$mim][NTf$_2$]$_2$ (wherein mim is methyl imidazolium), [obim]PF$_6$ (wherein obim is octyl butyl imidazolium), [oquin]NTf$_2$ (wherein oquin is octyl quinolinium), [hmim][PF$_3$(C$_2$F$_5$)$_3$], [C$_{14}$H$_{29}$mim]Br (wherein mim is methyl imidazolium), [Me$_2$N(C$_{12}$H$_{25}$)$_2$]NO$_3$, [emim]BF$_4$, [MeN(CH$_2$CH$_2$OH)$_3$], [MeOSO$_3$], [Hex$_3$PCl$_4$H$_{29}$]NTf$_2$, [emim][EtOSO$_3$], [choline][ibuprofenate], [emim]NTf$_2$, [emim][(EtO)$_2$PO$_2$], [emim]Cl/CrCl$_2$, or [Hex$_3$PC$_{14}$H$_{29}$]N(CN)$_2$. However, embodiments are not limited thereto. Any suitable material that may be used as the ionic liquid in the art may be used.

Unless specified otherwise, mim is methyl imidazolium, emim is ethyl methyl imidazolium, hmim is hexyl methyl imidazolium, obim is octyl butyl imidazolium, bmim is butyl methyl imidazolium, omim is octyl methyl imidazolium, pmim is propyl methyl imidazolium, bppyr is butyl methyl pyridinium, bpy is 4, 4'-bipyridine, Et is ethyl, Me is methyl, Pr is propyl, Bu is butyl, Ph is phenyl, Oct is octyl, Hex is hexyl, py is pyridine, obim is octyl butyl imidazolium, bquin is butyl quinolinium, heim is hexyl ethyl imidazolium, oquin is octyl quinolinium, and NTf$_2$ is bis(trifluoromethanesulfonyl)imide.

The polymer ionic liquid may be a polymeric ionic compound comprising, consisting essentially of, or consisting of an organic cation including an imidazolium group, and at least one of an organic or inorganic anion. The cation of the polymer ionic liquid may include at least one of poly(1-vinyl-3-alkylimidazolium), poly(1-allyl-3-alkylimidazolium), or poly(1-(meth)acryloyloxy-3-alkylimidazolium), each wherein the alkyl group may have 1 to 6 carbon atoms. The anion of the polymer ionic liquid may include at least one of CH$_3$COO$^-$, CF$_3$COO$^-$, CH$_3$SO$_3^-$, CF$_3$SO$_3^-$, (CF$_3$SO$_2$)$_2$N$^-$, (CF$_3$SO$_2$)$_3$C$^-$, (CF$_3$CF$_2$SO$_2$)$_2$N$^-$, C$_4$F$_9$SO$_3^-$, C$_3$F$_7$COO$^-$, or (CF$_3$SO$_2$)(CF$_3$CO)N$^-$.

The polymer ionic liquid may include, for example, at least one of poly(1-vinyl-3-alkylimidazolium), poly(1-allyl-3-alkylimidazolium), or poly(1-(meth)acryloyloxy-3-alkylimidazolium), each wherein the alkyl group may have 1 to 6 carbon atoms.

The metal particle of lithium metal and/or a lithium metal alloy may have a size of about 5 µm to about 50 µm, and in some embodiments, about 10 µm to about 50 µm, or about 20 µm to about 50 µm. As used herein, the term "size" may refer to an average particle diameter when the metal particle is in the form of spherical particles, or may refer to a length of the longest axis when the metal particle is in the form of non-spherical particles.

The size of the metal particle may be measured by laser diffraction particle size distribution analysis (i.e., laser diffraction scattering). In an embodiment the metal particle may include a coating on a surface thereof.

The metal particle may be, for example, at least one of a lithium metal powder or a lithium alloy powder.

The metal particle may be treated so as to have a coating layer that is stable in air on a core of the metal particle. When the particle comprises a coating layer, the average particle diameter of the metal particle refers to the size of the lithium metal and/or lithium metal alloy core without the coating layer.

The coating layer may be formed by coating the metal particle with, for example, a coating material including an organic rubber such as nitrile butadiene rubber (NBR) or styrene butadiene rubber (SBR), an organic resin such as an ethylene vinyl alcohol (EVA) copolymer resin, or an inorganic compound, for example, a metal carbonate such as Li$_2$CO$_3$ or a metal oxide such as Li$_2$O. A combination comprising at least one of the foregoing coating materials may be used. When metal particle has such a coating layer, it may be possible to prevent highly reactive lithium (Li) from reacting with moisture present in the air or a solvent and/or moisture present in a dispersion medium.

The lithium alloy may include lithium (Li), and at least one of Si, Sn, Al, Ge, Pb, Bi, Sb, Mg, In, Ca, Ti, V, a Si—Y' alloy (wherein Y' may be at least one of an alkaline metal, an alkaline earth metal, a Group 13 to Group 16 element, a transition metal, or a rare earth element, except for Si), a Sn—Y' alloy (wherein Y' may be at least one of an alkaline metal, an alkaline earth metal, a Group 13 to Group 16 element, a transition metal, or a rare earth element, except for Sn), or MnO$_x$ (wherein 0<x≤2). For example, the lithium alloy may be at least one of a lithium-aluminum (Li—Al) alloy, a lithium-magnesium alloy, a lithium-tin alloy, a lithium-indium alloy, a lithium-calcium alloy, a lithium-titanium alloy, or a lithium-vanadium alloy.

For example, the amount of the metal particle may be about 1 part by weight to about 50 parts by weight, and in some embodiments, about 5 parts by weight to about 40 parts by weight, and in some other embodiments, about 15 parts by weight to about 30 parts by weight, with respect to 100 parts by weight of a total weight of the composite electrolyte. When the amount of the metal particle is within these ranges, the anodeless lithium metal battery may have improved initial efficiency and capacity characteristics. In the anodeless lithium metal battery according to one or more embodiments, separate coating of an anode active material on the anode current collector can be omitted, and as a result, an energy density may be increased by controlling the amount of the metal particle added to the first liquid electrolyte.

The first organic solvent of the first liquid electrolyte may include at least one of a glyme compound, a dioxolane compound, an ether compound, a fluorinated ether compound, or a sulfone compound. The second liquid electrolyte may include any of the above-listed first organic solvents of the first liquid electrolyte, and/or a carbonate compound.

For example, the glyme compound may include at least one of ethylene glycol dimethylether(1,2-dimethoxyethane), ethylene glycol diethylether(1,2-diethoxyethane), propylene glycol dimethylether, propylene glycol diethylether, butylene glycol dimethylether, butylene glycol diethylether, diethylene glycol dimethylether, triethylene glycol dimethylether, tetraethylene glycol dimethylether, diethylene glycol diethylether, triethylene glycol diethylether, tetraethylene glycol diethylether, dipropylene glycol dimethylether, tripropylene glycol dimethylether, tetrapropylene glycol dimethylether, dipropylene glycol diethylether, tripropylene glycol diethylether, tetrapropylene glycol diethylether, dibutylene glycol dimethylether, tributylene glycol dimethylether, tetrabutylene glycol dimethylether, dibutylene glycol diethylether, tributylene glycol diethylether, or tetrabutylene glycol diethylether. For example, the fluorinated ether compound may be at least one of 1,1,2,2-tetrafluoroethyl 2,2,3,3-tetrafluoropropyl ether or 2,2,3,3,4,4,5,5-octafluoropentyl 1,1,2,2-tetrafluoroethyl ether.

The dioxolane compound may include, for example, at least one of 1,3-dioxolane, 4,5-dimethyl-1,3-dioxolane, 4,5-diethyl-1,3-dioxolane, 4-methyl-1,3-dioxolane, 4-ethyl-1,3-dioxolane, 2-methyl-1,3-dioxolane, 2-vinyl-1,3-dioxolane, 2,2-dimethyl-1,3-dioxolane, or 2-ethyl-2-methyl-1,3-dioxolane. The sulfone compound may be, for example, at least one of dimethyl sulfone, diethyl sulfone or ethylmethyl sulfone.

The carbonate compound may include, for example, at least one of ethylene carbonate, propylene carbonate, dimethyl carbonate, diethyl carbonate, butylene carbonate, ethylmethyl carbonate, fluoroethylene carbonate, methylpropyl carbonate, ethylpropyl carbonate, methylisopropyl carbonate, dipropyl carbonate, or dibutyl carbonate.

The first organic solvent may be include, for example, a fluorinated ether compound.

The amount of the fluorinated ether compound may be about 50 vol. % or less, or about 40 vol % or less, or about 30 vol % or less, and in some embodiments, about 0.1 vol. % to about 50 vol. %, or about 0.5 vol % to about 40 vol %, and in some other embodiments, about 1 vol. % to about 30 vol. % based on a total amount of the first organic solvent.

The fluorinated ether compound has a high flash point of about 80° C. or greater and excellent flame retardancy. When such a fluorinated ether compound is used as an organic solvent for a liquid electrolyte, a lithium metal battery having improved high-temperature stability may be manufactured. The fluorinated ether compound has a structure in which fluorinated functional groups are bonded to a —$CH_2$—O— moiety, and has a small polarity. Thus, the fluorinated ether compound may have excellent miscibility with an ether solvent capable of solvating lithium ions and having high dissolution capability, such as dimethyl ether (DME).

The fluorinated ether compound may include at least one of $HCF_2CF_2CH_2OCF_2CF_2H$, $HCF_2CF_2CH_2OCF_2CF_2CF_2H$, $HCF_2CF_2OCH_2CF_3$, $HCF_2CF_2OCH_2CH_2OCF_2CF_2H$, $HCF_2CF_2OCH_2CH_2CH_2OCF_2CF_2H$, $HCF_2CF_2CH_2OCF_2CF_2CF_2H$, $HCF_2CF_2OCH_2CH_2OCF_2CF_2CF_2H$, or $HCF_2CF_2OCH_2CH_2CH_2OCF_2CF_2CF_2H$.

The fluorinated ether compound may include, for example, 1,1,2,2-tetrafluoroethyl 2,2,3,3-tetrafluoropropyl ether or 2,2,3,3,4,4,5,5-octafluoropentyl 1,1,2,2-tetrafluoroethyl ether.

The lithium salt may be any lithium salt suitable to prepare the electrolyte. For example, the lithium salt may include at least one of LiSCN, $LiN(CN)_2$, $Li(CF_3SO_2)_3C$, $LiC_4F_9SO_3$, $LiPF_3(C_2F_5)_3$, LiCl, LiF, LiBr, LiI, $LiPF_6$, $LiPF_5(CF_3)$, $LiPF_5(C_2F_5)$, $LiPF_5(C_3F_7)$, $LiPF_4(CF_3)_2$, $LiPF_4(CF_3)(C_2F_5)$, $LiPF_3(CF_3)_3$, $LiPF_4(C_2O_4)_2$, $LiBF_4$, $LiBF_3(C_2F_5)$, lithium bis(oxalato) borate ($LiB(C_2O_4)_2$, LiBOB), lithium difluoro(oxalato)borate (LiDFOB), lithium bis(trifluoro methanesulfonyl)imide (LiTFSI), $LiN(SO_2CF_3)_2$), lithium bis(fluorosulfonyl)imide (LiFSI), $LiN(SO_2F)_2$, $LiN(SO_2C_2F_5)_2$, $LiCF_3SO_3$, $LiAsF_6$, $LiSbF_6$, or $LiClO_4$.

The first liquid electrolyte and the second liquid electrolyte may each have a viscosity at 25° C. of about 60 centipoise (cP) or less, and in some embodiments, about 50 cP or less, and in some embodiments, about 30 cP or less, and in some other embodiments, about 10 cP or less, and in some other embodiments, about 5 cP or less, or about 4.5 cP or less, or about 4 cP or less, and in some embodiments, about 1 cP to about 5 cP, or about 2 cP to about 4.5 cP, and in still other embodiments, about 0.01 cP to about 5 cP, or about 0.05 cP to about 5 cP, or about 0.05 cP to about 2.5 cP. When the first liquid electrolyte and the second liquid electrolyte have a viscosity within these ranges, ions may freely migrate in the first liquid electrolyte or the second liquid electrolyte, and ion conductivity may be improved. The first liquid electrolyte and the second liquid electrolyte may each have an ion conductivity at 25° C. of about 1.0 milliSiemens per centimeter (mS/cm) or greater, or about 2 mS/cm or greater, or about 4 mS/cm or greater, and in some embodiments, about 1 mS/cm to about 10 mS/cm, or about 1 mS/cm to about 7.5 mS/cm, or about 1 mS/cm to about 5 mS/cm.

Each of the first liquid electrolyte and the second liquid electrolyte may further include, in addition to the above-listed organic solvents, at least one of γ-butyrolactone, succinonitrile, adiponitrile, benzonitrile, acetonitrile, tetrahydrofuran, 2-methyltetrahydrofuran, N,N-dimethylformamide, N,N-dimethylacetamide, dimethyl sulfoxide, dioxane, sulfolane, dichloroethane, chlorobenzene, or nitrobenzene.

The composite electrolyte may be, for example, in a gel or semi-solid form. When the composite electrolyte has a gel or semi-solid form, the metal particle may freely expand during charge and discharge, avoiding limitations to expansion present in a solid, and avoiding expansion-related degradation mechanisms.

The composite electrolyte may include, for example, the metal including at least one of lithium metal and a lithium metal alloy, and a first liquid electrolyte.

In some embodiments, the composite electrolyte may be prepared by combining the metal with the first electrolyte to prepare a composite electrolyte composition, coating the composite electrolyte composition on the anode current collector to form a coated composite electrolyte, and drying the coated composite electrolyte. The anode current collector may be a mesh-type current collector. When using a mesh-type current collector as the anode current collector, the anode current collector may be effectively impregnated with the composite electrolyte. Accordingly, the composite electrolyte may not include a non-woven fabric.

The composite electrolyte composition may be prepared by mixing the metal (metal particle) with a first liquid electrolyte. The composite electrolyte composition may have a gel or semi-solid form. The composite electrolyte composition may have a viscosity at 25° C. of about 90 cP or less, for example, about 80 cP or less, for example, about 60 cP or less, for example, about 50 cP or less, for example, about 30 cP or less, for example, about 10 cP or less, for example, about 5 cP or less, or about 4.5 cP or less, or about 4 cP or less, and in some embodiments, about 1 cP to about 5 cP, or about 2 cP to about 4.5 cP, or about 2.5 cP to about 4.0 cP, but the viscosity of the composition is not limited thereto.

Optionally, after the coating of the composite electrolyte composition on the anode current collector, a non-woven fabric may be disposed thereon.

Next, the liquid-impermeable ion-conductive composite membrane, a cathode including a cathode active material layer, and a cathode current collector may be sequentially disposed on the resulting structure, thereby manufacturing the anodeless lithium metal battery according to one or more embodiments.

In the lithium metal battery according to one or more embodiments, the lithium from the metal particle including at least one of metal or a lithium metal alloy may be deposited on the anode current collector during charge. The deposited lithium may have an interconnected network structure that is formed upon charge of the anodeless lithium metal battery. Conventional lithium anode thin film do not have a free volume before and after charging, and are expanded upward and downward, resulting in more stress due to dendrite formation. Unlike the lithium anode thin film that may only expand in an upper or lower direction, the metal particle in the anodeless lithium metal battery may expand in a radial direction as shown in FIG. 1C, leading to nearly zero stress, thus improving energy density and reducing an expansion rate of the battery after charging and discharging.

In the anodeless lithium metal battery, the interconnected structure of the lithium metal and/or the lithium alloy may be in the form of a particle or in the form of a layer on a surface of the anode current collector. The interconnected structure of the lithium metal and/or the lithium alloy may be in the form of a continuous or discontinuous layer. When the interconnected structure of the lithium metal and/or the lithium alloy forms a layer on the anode current collector, a thickness of the layer may be about 10% or less, and in some embodiments, about 5% or less, and in some other embodiments, about 2% or less, and in still other embodiments, about 1% or less, and in yet other embodiments, about 0.1% to about 1%, about 0.1 to about 10%, or about 0.1 to about 5%, with respect to a thickness of the cathode.

In the anodeless lithium metal battery according to one or more embodiments, a continuous or discontinuous lithium metal layer may not be formed on the anode current collector after charging and discharging of the anodeless lithium metal battery.

After charge and discharge, the composite electrolyte may contact the negative electrode current collector. Here, a lithium metal layer may be not formed uniformly or not at all between the negative electrode current collector and the composite electrolyte even after charge and discharge.

A contact area between at least one of the lithium metal and the lithium alloy and the first liquid electrolyte of the composite electrolyte may be at least twice the contact area between at least one of lithium metal layer and lithium alloy layer of the same volume and the first electrolyte.

The cathode according to an embodiment may be manufactured in the following manner. For example, a cathode active material, a conducting agent, a binder, and a solvent may be mixed together to prepare a cathode active material composition. The cathode active material composition may be directly coated on a metallic current collector to prepare a cathode. In some other embodiments, the cathode active material composition may be cast on a separate support to form a cathode active material film. The cathode active material film may then be separated from the support and laminated on a metallic current collector, to thereby prepare a cathode. Any suitable cathode may be used, the cathode may be any of a variety of types, and not limited to these examples.

In an embodiment, the cathode active material may be a lithium composite oxide. Any suitable lithium composite oxide available may be used. For example, the lithium composite oxide may be at least one of a composite oxide of lithium with at least one of a metal selected from cobalt, manganese, or nickel. In some embodiments, the cathode active material may be a compound represented by at least one of: $Li_aA_{1-b}B'_bD_2$ (wherein $0.90 \leq a \leq 1.8$, and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1.8$, $0 \leq b \leq 0.5$ $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1.8$, $0 \leq b \leq 0.5$, $0 \leq c \leq 0.05$, and $0 < \alpha < 2$); $Li_aN_{i_b}E_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 < d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2GbO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); or $LiFePO_4$.

In the above formulae, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

The compounds listed above as the cathode active material may have a surface coating layer (hereinafter, also referred to as "coating layer"). Alternatively, a combination of a compound without a coating layer and a compound having a coating layer may be used. In an embodiment, the coating layer may include at least one of a coating element selected from an oxide, a hydroxide, an oxyhydroxide, an oxycarbonate, or a hydroxycarbonate of the coating element. In an embodiment, the compound for forming the coating layer may be amorphous or crystalline. In some embodiments, the coating element for forming the coating layer may be at least one of magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), or zirconium (Zr). In an embodiment, the coating layer may be formed using any method that does not adversely affect the physical characteristics of the cathode active material when a compound of the coating element is used. For example, the coating layer may be formed using spray coating or dipping. Details of such coating methods can be determined by one of ordinary skill in the art without undue experimentation, and thus a further detailed description thereof will be omitted.

Non-limiting examples of the conducting agent may include: carbon black; graphite particle; natural graphite; artificial graphite; acetylene black; Ketjen black; carbon fiber; carbon nanotube; metal powder, metal fiber or metal tube of copper, nickel, aluminum, and silver; and a conductive polymer such as polyphenylene derivative. However, embodiments are not limited thereto, and any suitable conducting agent may be used.

Non-limiting examples of the binder may include vinylidene fluoride/hexafluoropropylene copolymer, polyvinylidene fluoride, polyimide, polyethylene, polyester, polyacrylonitrile, polymethyl methacrylate, polytetrafluoroethylene (PTFE), a carboxymethyl cellulose/styrene-butadiene rubber (SMC/SBR) copolymer, or a styrene butadiene rubber-based polymer, or a combination thereof. However, embodiments are not limited thereto, and any material suitable for use as a binder in a lithium metal battery may be used. Any suitable binder may be used.

For example, the solvent may be at least one of N-methylpyrrolidone, acetone, or water. However, examples of the solvent are not limited thereto, and any suitable solvent may be used.

The amounts of the cathode active material, the conducting agent, the binder, and the solvent may be determined by those of skill in the art without undue experimentation. At least one of the conducting agent, the binder, and the solvent may be omitted depending on the use and the structure of a lithium metal battery.

The anodeless lithium metal battery according to one or more embodiments may further include a separator.

For example, the separator may be a single-layer structure or a multi-layer structure including at least one or two layers of polyethylene, polypropylene, polyvinylidene fluoride, or a combination thereof. For example, the separator may be a mixed multilayer structure, such as a two-layer separator of polyethylene/polypropylene, a three-layer separator of polyethylene/polypropylene/polyethylene, or a three-layer separator of polypropylene/polyethylene/polypropylene.

A battery case may have a cylindrical, rectangular, pouch, or thin film shape. For example, the lithium metal battery according to one or more embodiments may be a lithium ion battery. For example, the lithium metal battery according to one or more embodiments may be a lithium air battery, a lithium sulfur battery, or the like.

The lithium metal battery according to any of the above-described embodiments may have improved lifetime characteristics and high rate characteristics, and thus may be used in, for example, electric vehicles (EVs). For example, the lithium metal battery may be used in hybrid vehicles such as plug-in hybrid electric vehicles (PHEV) or the like. The lithium metal battery may also be used in the fields where storage of a large amount of power is required. For example, the lithium metal battery may be used in electric bikes, power tools, and the like.

One or more embodiments of the present disclosure will now be described in detail with reference to the following examples. However, these examples are only for illustrative purposes and are not intended to limit the scope of the one or more embodiments of the present disclosure.

EXAMPLES

Example 1: Anodeless Lithium Metal Battery

After a composition for forming a composite electrolyte was applied on a copper foil used as an anode current collector, a cellulose non-woven fabric (having a porosity of about 50% and a thickness of about 30 μm) was disposed thereon, and the resulting structure was dried to form the composite electrolyte (having a thickness of about 50 μm) on the anode current collector.

The composite electrolyte composition was prepared by mixing 3.5 M of a first liquid electrolyte, with lithium metal powder (having a particle size of about 50 μm). The first electrolyte was prepared by mixing lithium bis(fluorosulfonyl)imide (LiFSI) with 1,2-dimethoxyethane. The amount of the lithium metal powder was about 20 parts by weight with respect to 100 parts by weight of a total weight of the composite electrolyte (i.e., a total weight of the lithium salt, the organic solvent, and the lithium metal powder).

A cathode was manufactured as follows.

A liquid electrolyte for the cathode was prepared by mixing 0.4 M of lithium bis(trifluoro methanesulfonyl)imide (LiTFSI), 0.6 M of lithium bis(oxalate)borate (LiBOB), and ethylene carbonate with ethylmethyl carbonate in a volume ratio of about 3:7.

A cathode active material layer forming composition was obtained by mixing $LiNi_{1/3}CO_{1/3}Mn_{1/3}O_2$, a carbon black conducting agent (Super-P™, Timcal Ltd.), polyvinylidene fluoride (PVdF), and N-methyl pyrrolidone. A weight ratio of $LiNi_{1/3}CO_{1/3}Mn_{1/3}O_2$ to the conducting agent to the PVdF in the cathode active material layer forming composition was about 97:1.5:1.5. The cathode active material layer forming composition was coated on an aluminum foil (having a thickness of about 15 μm) and then dried at about 25° C. Then, the resulting dried product was further dried under vacuum at about 110° C., thereby manufacturing the cathode.

A $Li_{1.4}Ti_{1.6}Al_{0.4}P_3O_{12}$ (LTAP) membrane having a thickness of about 90 μm was arranged between the cathode and the composite electrolyte on the anode current collector and assembled together, thereby manufacturing an anodeless lithium metal battery.

Example 2: Anodeless Lithium Metal Battery

An anodeless lithium metal battery was manufactured in the same manner as in Example 1, except that lithium metal powder having a particle size of about 20 μm was used to prepare the composite electrolyte.

Examples 3 to 4: Anodeless Lithium Metal Battery

Anodeless lithium metal batteries were manufactured in the same manner as in Example 1, except that the amount of the lithium metal powder was changed to about 1 part by weight and about 50 parts by weight, respectively, with respect to 100 parts by weight of the composite electrolyte.

Examples 5 and 6: Anodeless Lithium Metal Battery

Anodeless lithium metal batteries were manufactured in the same manner as in Example 1, except that 2 M of the first liquid electrolyte and 4 M of the first liquid electrolyte were used, respectively, instead of 3.5 M of the first liquid electrolyte.

Examples 7 and 8: Anodeless Lithium Metal Battery

Anodeless lithium metal batteries were manufactured in the same manner as in Example 1, except that the thickness of the LTAP membrane was changed to about 20 μm and about 45 μm, respectively.

Example 9: Anodeless Lithium Metal Battery

An anodeless lithium metal battery was manufactured in the same manner as in Example 1, except that the composition for forming the composite electrolyte was supplied onto a copper mesh used as the anode current collector, and a cellulose non-woven fabric was not disposed thereon.

Due to the use of the copper mesh as the anode current collector in Example 9, which may be impregnated with the composition for forming the composite electrolyte, the cellulose non-woven fabric used in Example 1 was not needed.

Examples 10 and 11: Anodeless Lithium Metal Battery

Anodeless lithium metal batteries were manufactured in the same manner as in Example 1, except that the thickness of the composite electrolyte was changed to about 10 μm and about 150 μm, respectively.

Comparative Example 1: Anodeless Lithium Metal Battery

A copper foil as an anode current collector was dipped in a 1 M HCl solution for about 10 minutes, washed with distilled water and acetone, and then dried.

A cathode was manufactured by coating a nickel cobalt manganese (NCM) thin film on an aluminum foil. A liquid electrolyte for the cathode was prepared by mixing 0.4 M LiTFSI, 0.6 M of lithium bis(oxalato)borate (LiBOB), and ethylene carbonate with ethylmethyl carbonate in a volume ratio of about 3:7. The liquid electrolyte was disposed between the cathode and a solid electrolyte described below.

$LiNi_{1/3}CO_{1/3}Mn_{1/3}O_2$, a carbon black conducting agent (Super-P™, available from Timcal Ltd.), polyvinylidene fluoride (PVdF), and N-methyl pyrrolidone were mixed to obtain a cathode composition. A weight ratio of $LiNi_{1/3}CO_{1/3}Mn_{1/3}O_2$ to the conducting agent to the PVdF in the cathode active material layer forming composition was about 97:1.5:1.5.

The cathode active material layer forming composition was coated on the aluminum foil (having a thickness of about 15 μm) and dried at about 25° C., then further under vacuum at about 110° C., thereby manufacturing the cathode.

The cathode, the liquid electrolyte on the anode current collector, which was prepared as described above for the anode electrolyte by mixing 3.5 M of LiFSI with dimethylether (DME), and the separator (Celgard 2045) were used to manufacture an anodeless lithium metal battery.

A $Li_{1.4}Ti_{1.6}Al_{0.4}P_3O_{12}$ (LTAP) membrane having a thickness of about 90 μm was used as a solid electrolyte. The cathode was disposed on a surface of the solid electrolyte, while the liquid electrolyte (anode electrolyte) and the anode current collector were sequentially disposed on the surface of the solid electrolyte opposite to the cathode. Then, the cathode, the solid electrolyte, the composite electrolyte, and the anode current collector were assembled together, thereby manufacturing the anodeless lithium metal battery.

The liquid electrolyte used as the anode electrolyte in Comparative Example 1 did not contain lithium metal, unlike the composite electrolyte of Example 1. In the anodeless lithium metal battery of Comparative Example 1, the liquid electrolyte was prone to reduction due to a nucleation potential generated between the lithium and current collector metal during deposition of lithium, and formation of lithium dendrite was facilitated, thus reducing charge-discharge efficiency and lifetime of the lithium metal battery.

Comparative Example 2: Lithium Metal Battery

A separator (Celgard 2045) was arranged between a lithium metal anode (having a thickness of about 20 μm) and a cathode, and a 3.5 M of a liquid electrolyte obtained by mixing LiTFSI with dimethylether (DME) as an organic solvent was used.

The cathode was manufactured using a cathode composition obtained by mixing $LiNi_{1/3}CO_{1/3}Mn_{1/3}O_2$, a carbon black conducting agent (Super-P™, available from Timcal Ltd.), polyvinylidene fluoride (PVdF), and N-methylpyrrolidone. A mixed weight ratio of $LiNi_{1/3}Co_{1/3}Mn_{1/3}O_2$ to the conducting agent to the PVdF in the cathode composition was about 97:1.5:1.5. The cathode composition was coated on an aluminum foil (having a thickness of about 15 μm) and then dried at about 25° C. Then, the resulting dried product was further dried under vacuum at about 110° C., thereby manufacturing the cathode.

Evaluation Example 1: Impedance Analysis

1) Initial Impedance

Initial impedance characteristics of the lithium metal batteries of Example 1 and Comparative Example 1 were evaluated by measuring resistance using a 2-probe method with an impedance analyzer (Solartron 1260A Impedance/Gain-Phase Analyzer) at about 25° C. in a frequency range of about $10^6$ megahertz (MHz) to 0.1 MHz at a voltage bias of about 10 millivolts (mV).

Figure 6A:
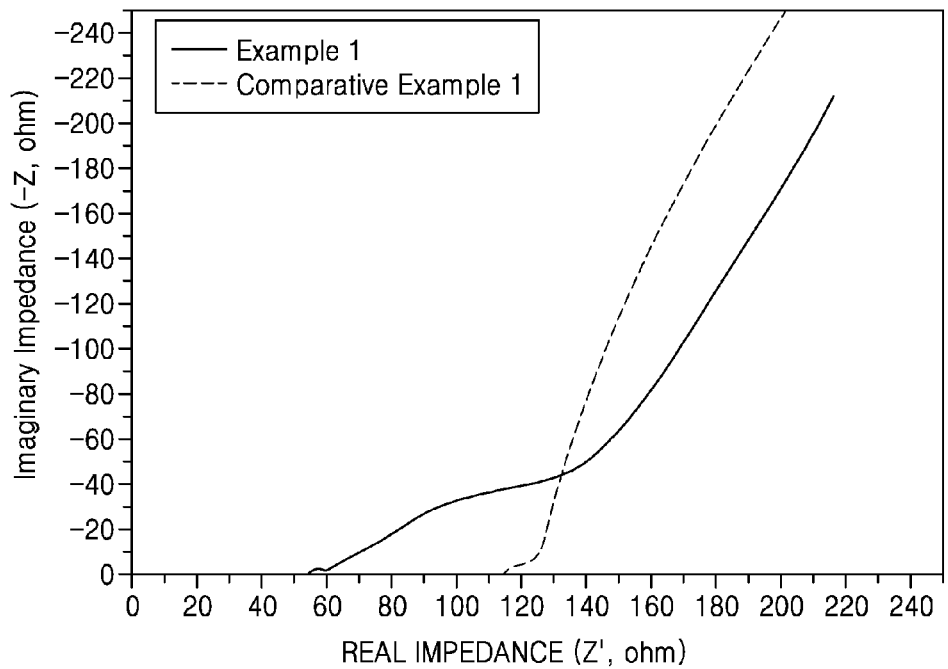
FIG. 6A is a graph of imaginary impedance (—Z, ohm) versus real impedance (Z', ohm), illustrating initial impedance characteristics of the anodeless lithium metal batteries of Example 1 and Comparative Example 1.

Nyquist plots obtained from the results of the impedance measurements that were performed 24 hours from the manufacture of the anodeless lithium metal batteries of Example 1 and Comparative Example 1, are shown in FIG. 6A. In FIG. 6A, a bulk resistance of an electrode depends from the position and size of a semicircle, and may be represented as a difference between the left x-intercept and the right x-intercept of the semicircle.

Referring to FIG. 6A, the anodeless lithium metal battery of Example 1 was found to have a remarkably reduced bulk resistance, compared to the anodeless lithium metal battery of Comparative Example 1.

2) Impedance after One Cycle

Impedance characteristics after one cycle of the lithium metal batteries of Example 1 and Comparative Example 1 were evaluated in the following manner.

Each of the lithium metal batteries was charged at about 25° C. with a constant current of 0.1 C rate to a voltage of about 4.30 volts (V) (with respect to Li), and then with a constant voltage of 4.30 V until a cutoff current of 0.05 C was reached, and was then discharged with a constant current of 0.1 C to a voltage of about 2.8 V (with respect to Li) (Formation process, $1^{st}$ cycle). This charging and discharging process was performed an additional two times to complete the formation process. A C rate is a discharge rate of a cell, and is obtained by dividing a total capacity of the cell by a total discharge period of time of 1 hour, e.g., a C rate for a battery having a discharge capacity of 1.6 ampere-hours would be 1.6 amperes.

Subsequently, each of the lithium metal batteries was charged at about 25° C. with a constant current of 0.1 C (0.38 milliamperes per square centimeter ($mA/cm^2$)) to a voltage of about 4.40 V (with respect to Li), and then with a constant voltage of 4.40 V until a cutoff current of 0.05 C was reached. After this charging once, impedance characteristics after one cycle of each of the lithium metal batteries were evaluated by measuring resistance using a 2-probe method with an impedance analyzer (Solartron 1260A Impedance/Gain-Phase Analyzer) in a frequency range of about $10^6$ to 0.1 MHz at a voltage bias of about 10 mV at about 25° C. The evaluation results are shown in FIG. 6B.

Figure 6B:
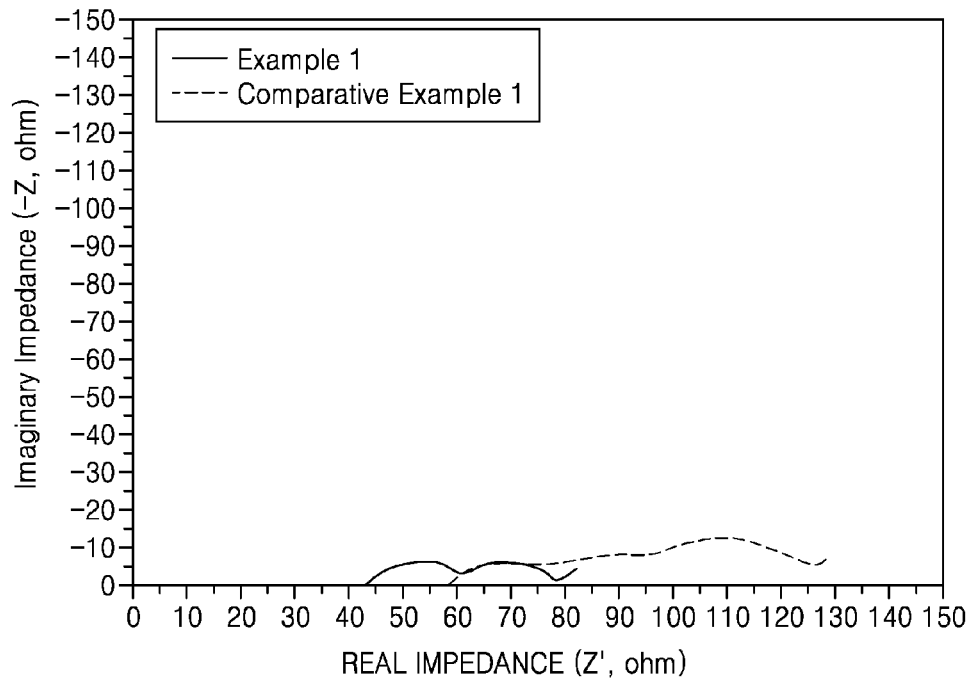
FIG. 6B is a graph of imaginary impedance (—Z, ohm) versus real impedance (Z', ohm), illustrating impedance characteristics after one cycle in the anodeless lithium metal batteries of Example 1 and Comparative Example 1.

Referring to FIG. 6B, the resistance of the anodeless lithium metal battery of Comparative Example 1 was reduced compared to that before charging and discharging after one cycle of charging and discharging, but still increased as compared with the anodeless lithium metal battery of Example 1.

Evaluation Example 2: Charge-Discharge Characteristics

The lithium metal batteries of Example 1 and Comparative Examples 1 and 2 were charged at about 25° C. with a constant current of 0.1 C to a voltage of about 4.30 V (with respect to Li), and then with a constant voltage of 4.30 V until a cutoff current of 0.05 C was reached, and were then discharged with a constant current of 0.1 C rate to a voltage of about 2.8 V (with respect to Li) (Formation process, $1^{st}$ cycle). This charging and discharging process was performed further twice to complete the formation process.

After the formation process, each of the lithium metal batteries was charged at room temperature (25° C.) with a constant current of i) 0.5C or ii) 1 C in a voltage range of about 3.0 V to 4.4 V (with respect to Li) and then discharged with a constant current of 0.2 C (0.72 mA) until a cutoff voltage of 3.0 V was reached. This charging and discharging cycle was repeated 50 times in total. Coulombic efficiency was calculated using Equation 1.

Coulombic efficiency (%)=(Discharge capacity of selected cycle/Charge capacity of selected cycle)×100%  Equation 1

Figure 2A:
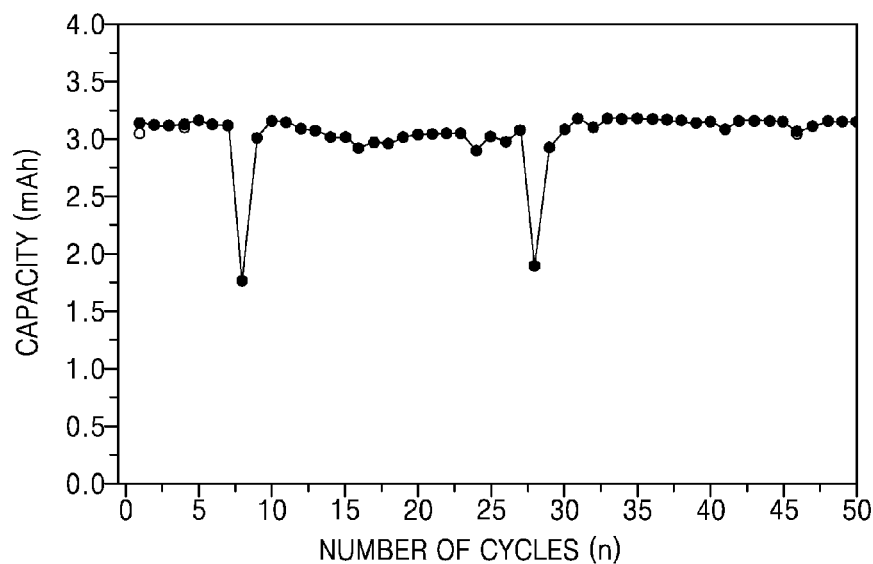
FIG. 2A is a graph of capacity (milliampere-hours, mAh) versus the number of cycles (n) in an anodeless lithium metal battery manufactured in accordance with Example 1.
Figure 2B:
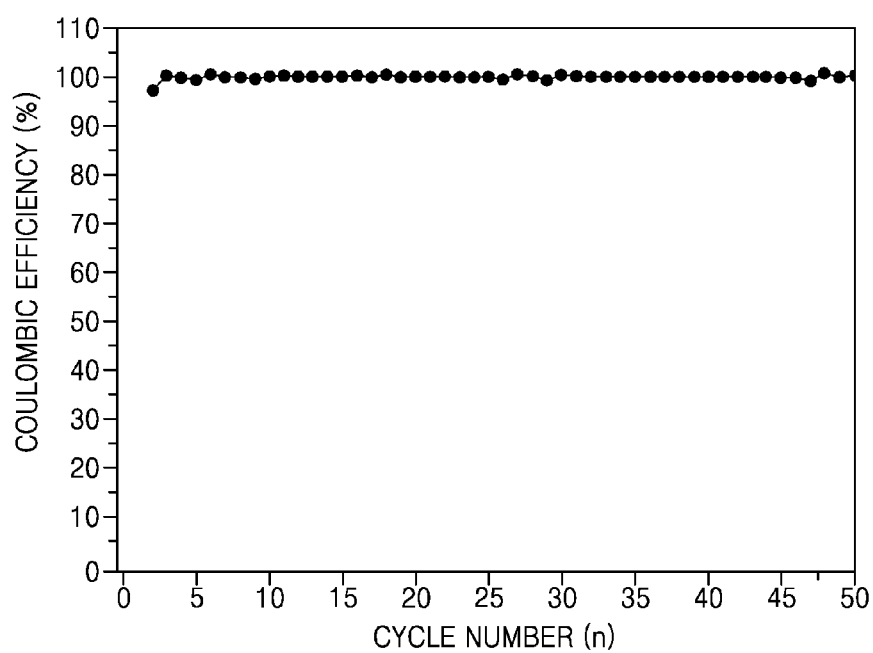
FIG. 2B is a graph of coulombic efficiency (percent, %) versus number of cycles (n), in an anodeless lithium metal battery manufactured in accordance with Example 1.
Figure 3A:
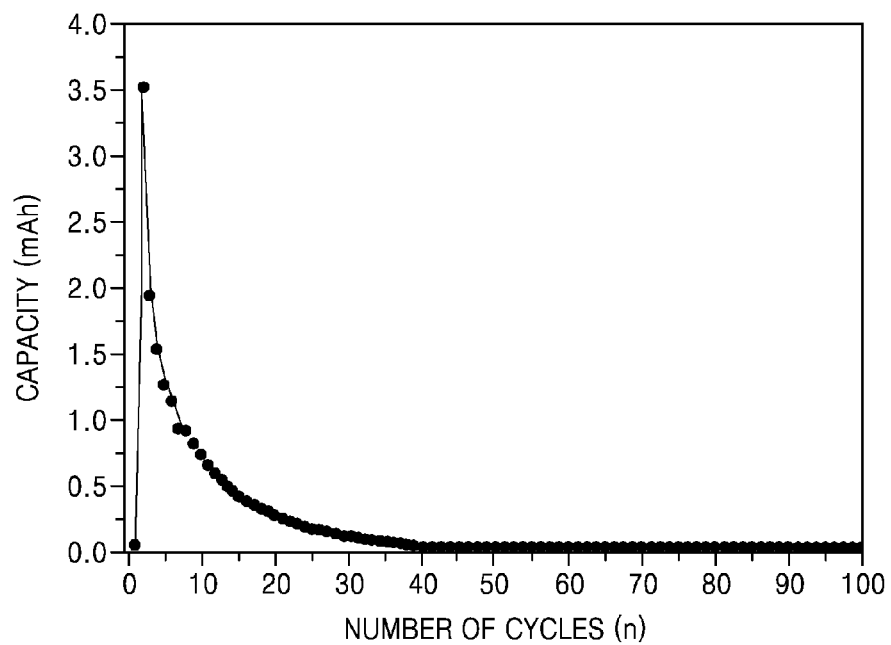
FIG. 3A is a graph of capacity (mAh) versus the number of cycles (n) in an anodeless lithium metal battery manufactured in accordance with Comparative Example 1.
Figure 3B:
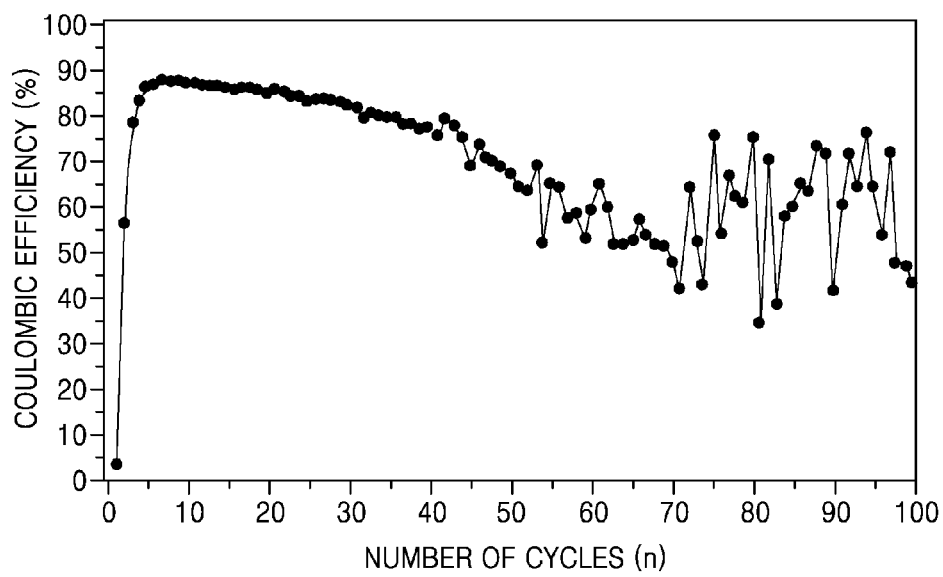
FIG. 3B is a graph of coulombic efficiency (%) versus number of cycles (n) in an anodeless lithium metal battery manufactured in accordance with Comparative Example 1.
Figure 4A:
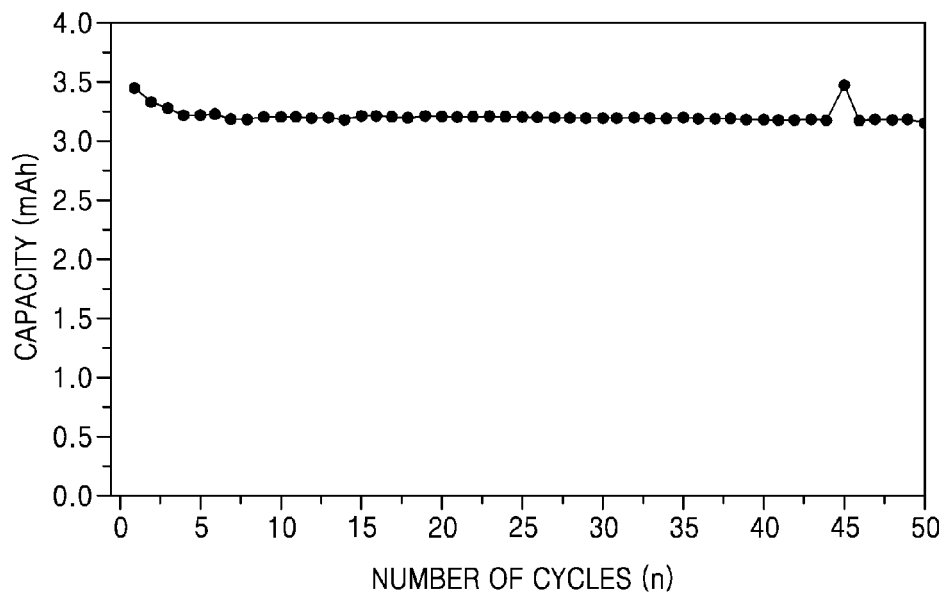
FIGS. 4A and 4B is a graph of capacity (mAh) versus and the number of cycles (n) in a lithium metal battery manufactured in accordance with Comparative Example 2.
Figure 4B:
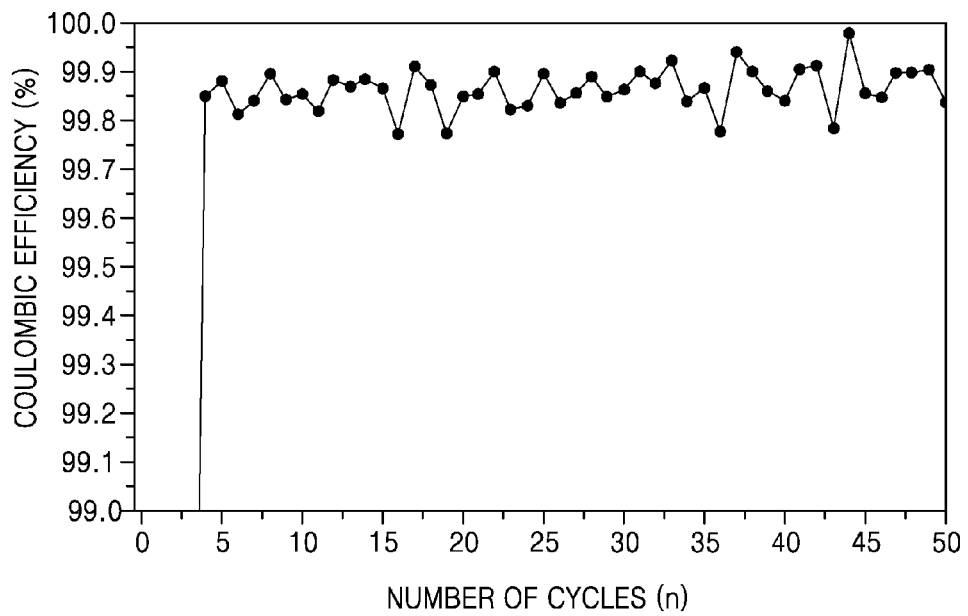

The results of evaluation of the charge-discharge characteristics are shown in FIGS. 2A, 2B, 3A, 3B, 4A, and 4B. FIGS. 2A and 2B show changes in capacity and Coulombic efficiency, respectively, with respect to the number of cycles in the anodeless lithium metal battery of Example 1. FIGS. 3A and 3B show changes in capacity and Coulombic efficiency, respectively, with respect to the number of cycles in the anodeless lithium metal battery of Comparative Example 1. FIGS. 4A and 4B show changes in capacity and Coulombic efficiency, respectively, with respect to the number of cycles in the lithium metal battery of Comparative Example 2.

Referring to FIGS. 3A and 3B, the anodeless lithium metal battery of Comparative Example 1 was found to have a charge and discharge efficiency (Coulombic efficiency) less than 90% and a reduced capacity retention of less than 50% in 10 cycles.

Referring to FIGS. 4A and 4B, the lithium metal battery of Comparative Example 2 was found to maintain a Coulombic efficiency (charge and discharge efficiency) of about 99.8% and a capacity retention of about 98% after 50 cycles at 0.5 C. Referring to FIGS. 2A and 2B, the anodeless lithium metal battery of Example 1 was found to maintain a good charge and discharge efficiency and to have no reduction in capacity retention in 50 cycles at 0.5 C.

Charge and discharge characteristics of the anodeless lithium metal batteries of Examples 3 to 11 were evaluated in the same manner as applied to the anodeless lithium metal battery of Example 1.

As a result of the evaluation, the anodeless lithium metal batteries of Examples 3 to 11 were found to have equivalent or similar charge and discharge characteristics as those of the anodeless lithium metal battery of Example 1.

The lithium metal batteries of Example 1 and Comparative Example 1 were charged at about 25° C. with a constant current of 0.1 C to a voltage of about 4.30 V (with respect to Li), and then with a constant voltage of 4.30 V until a cutoff current of 0.05 C was reached, and were then discharged with a constant current of 0.1 C to a voltage of about 2.8V (with respect to Li) (Formation process, $1^{st}$ cycle). This charging and discharging process was performed two additional times to complete the formation process.

Each of the lithium metal batteries after the formation process was charged at room temperature (25° C.) with a constant current of i) 0.5C or ii) 1 C in a voltage range of about 3.0 V to 4.4 V (with respect to Li) and then discharged with a constant current of 0.2 C (0.72 mA) until a cutoff voltage of 3.0 V was reached. This charge and discharge cycle was repeated 100 times in total. Changes in discharge capacity with respect to the number of cycles are shown in FIG. 5A.

Figure 5A:
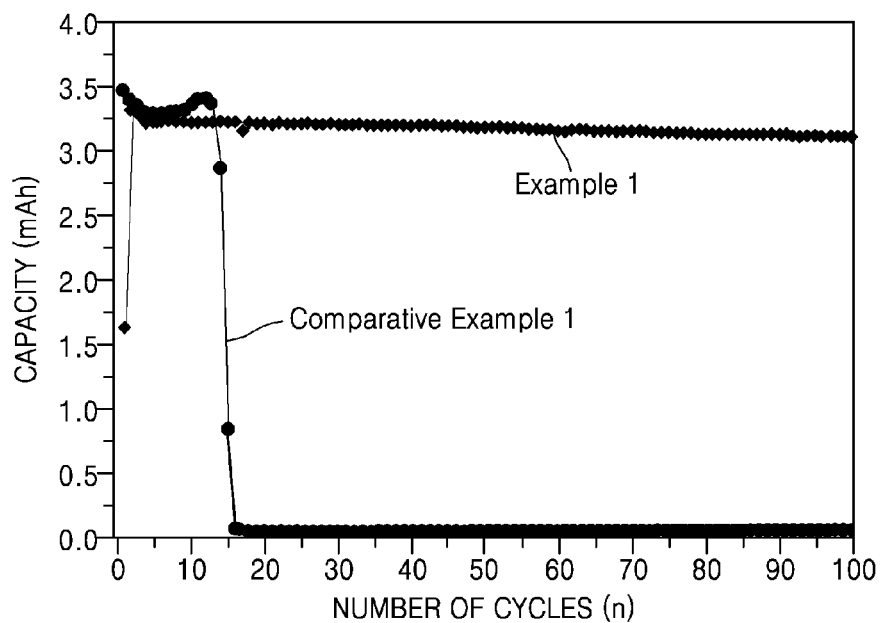
FIG. 5A is a graph of discharge capacity (mAh) versus the number of cycles (n) in the anodeless lithium metal batteries of Example 1 and Comparative Example 1.

Referring to FIG. 5A, the anodeless lithium metal battery of Comparative Example 1 was found not to work after 15 cycles, while the anodeless lithium metal battery of Example 1 maintained excellent discharge capacity even after 100 cycles. The anodeless lithium metal battery of Example 1 had a capacity retention of about 80% after 170 cycles.

Evaluation Example 3: Rate Capability

Rate capabilities of the lithium metal batteries of Example 1 and Comparative Example 2 were evaluated using the following method.

Each of the lithium metal batteries of Example 1 and Comparative Example 2 was charged with a constant current (0.2 C) and a constant voltage (4.3 V, 0.05 C cut-off). After a rest for about 10 minutes, the lithium metal batteries were discharged with a constant current (0.1 C, 0.5 C, or 1 C) until a voltage of about 3.0 V was reached. In particular, with periodic changing of discharge rate to 0.1 C, 0.5 C, or 1 C at every increase in charge and discharge cycle number, high-rate discharge characteristics (referred to also as "rate capability") of each lithium metal battery were evaluated. During the $1^{st}$ to $3^{rd}$ charge and discharge cycles, each lithium metal battery was discharged at a rate of 0.1 C. A rate capability of each lithium metal battery was defined by Equation 2.

Rate capability (%)=(Discharge capacity when discharged at a specific constant current)/(Discharge capacity when discharged at a discharge rate of 0.1 C)×100%  Equation 2

Figure 5B:
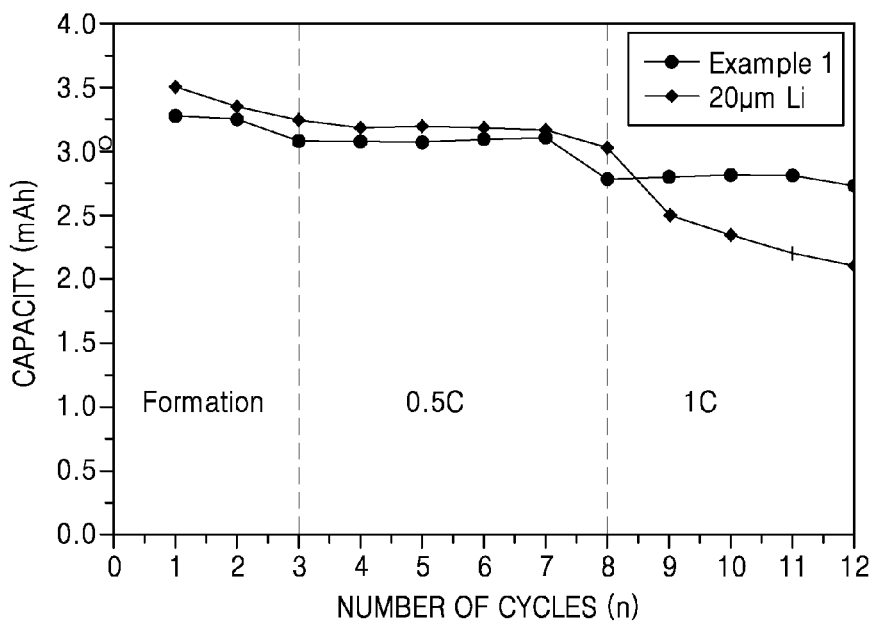
FIG. 5B is a graph of capacity (mAh) versus the number of cycles (n), illustrating the result of the evaluation of rate capability of the anodeless lithium metal batteries of Example 1 and Comparative Example 2.

The results of the evaluation are shown in FIG. 5B. In FIG. 5B, "20 μm Li" refers to the lithium metal battery of Comparative Example 2.

Referring to FIG. 5B, the anodeless lithium metal battery of Example 1 was found to have similar capacity characteristics at 0.5 C to those of the lithium metal battery of Comparative Example 2, but remarkably improved capacity characteristics at 1.0 C or greater, compared to those of the lithium metal battery of Comparative Example 2.

As described above, according to an embodiment, an anodeless lithium metal battery may have improved energy density and lifetime characteristics.

It should be understood that the embodiment described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A charged lithium metal battery comprising:
a cathode comprising a cathode current collector and a cathode active material layer on the cathode current collector;
an anode current collector, wherein the anode current collector is a mesh current collector;
a composite electrolyte between the cathode and the anode current collector, wherein the composite electrolyte comprises
a first electrolyte comprising a lithium salt and a first organic solvent, and
an interconnected network structure disposed on a surface of the anode current collector, the interconnected network structure comprising a plurality of connected metal particles, each metal particle comprising a core of at least one of lithium or lithium metal alloy, and lithium from the lithium salt is electrodeposited on a surface of the core of the metal particles,
wherein the electrodeposited lithium connects the metal particles to form a layer, and
a liquid-impermeable ion-conductive composite membrane disposed between the cathode and the composite electrolyte, wherein the liquid-impermeable ion-conductive composite membrane comprises at least one of a solid ionic conductor or a composite comprising the solid ionic conductor and a non-ionic conductor.

2. The charged lithium metal battery of claim 1,
The charged lithium metal battery of claim 1, wherein the first organic solvent comprises at least one selected from the group consisting of an ether compound and a sulfone compound.

3. The charged lithium metal battery of claim 2, wherein the first organic solvent comprises the ether compound, wherein the ether compound is at least one selected from the group consisting of a glyme compound, a dioxolane compound, and a fluorinated ether compound.

4. The charged lithium metal battery of claim 3, wherein the glyme compound is at least one selected from the group consisting of ethylene glycol dimethylether, ethylene glycol diethylether, propylene glycol dimethylether, propylene glycol diethylether, butylene glycol dimethylether, butylene glycol diethylether, diethylene glycol dimethylether, triethylene glycol dimethylether, tetraethylene glycol dimethylether, diethylene glycol diethylether, triethylene glycol diethylether, tetraethylene glycol diethylether, dipropylene glycol dimethylether, tripropylene glycol dimethylether, tetrapropylene glycol dimethylether, dipropylene glycol diethylether, tripropylene glycol diethylether, tetrapropylene glycol diethylether, dibutylene glycol dimethylether, tributylene glycol dimethylether, tetrabutylene glycol dimethylether, dibutylene glycol diethylether, tributylene glycol diethylether, and tetrabutylene glycol diethylether, the dioxolane compound is at least one selected from the group consisting of 1,3-dioxolane, 4,5-dimethyl-1,3-dioxolane, 4,5-diethyl-1,3-dioxolane, 4-methyl-1,3-dioxolane, 4-ethyl-1,3-dioxolane, 2-methyl-1,3-dioxolane, 2-vinyl-1,3-dioxolane, 2,2-dimethyl-1,3-dioxolane, and 2-ethyl-2-methyl-1,3-dioxolane, and
the fluorinated ether compound is at least one selected from the group consisting of 1,1,2,2-tetrafluoroethyl 2,2,3,3-tetrafluoropropyl ether, and 2,2,3,3,4,4,5,5-octafluoropentyl 1,1,2,2-tetrafluoroethyl ether.

5. The charged lithium metal battery of claim 4, wherein the first organic solvent comprises the fluorinated ether compound.

6. The charged lithium metal battery of claim 2, wherein the first organic solvent is selected from the group consisting of dimethyl sulfone, diethyl sulfone, and ethylmethyl sulfone.

7. The charged lithium metal battery of claim 1, wherein the cathode active material layer further comprises a second electrolyte comprising a lithium salt and a second organic solvent, and
the second organic solvent comprises at least one selected from the group consisting of an ether compound, a sulfone compound, and a carbonate compound,
wherein the first electrolyte has a composition which is the same or different than a composition of the second electrolyte.

8. The charged lithium metal battery of claim 7, wherein a concentration of the lithium salt in the first electrolyte and a concentration of the lithium salt in the second electrolyte are each independently about 1 molar to about 8 molar.

9. The charged lithium metal battery of claim 8, wherein a concentration of the lithium salt in the first electrolyte and a concentration of the lithium salt in the second electrolyte are each independently about 2 molar to about 5 molar.

10. The charged lithium metal battery of claim 1, wherein the composite electrolyte has a viscosity at 25° C. of about 0.05 centipoise to about 60 centipoise.

11. The charged lithium metal battery of claim 1, wherein the solid ionic conductor comprises at least one selected from the group consisting of $Li_{1+x}Ti_{2-x}Al_x(PO_4)_3$ wherein $0 \leq x < 4$, $Li_{1+x+y}Al_xTi_{2-x}Si_yP_{3-y}O_{12}$ wherein $BaTiO_3$, $Pb(Zr_{1-x}Ti_x)O_3$ wherein $0 \leq x \leq 1$, $Pb_{1-x}La_xZr_{1-y}Ti_yO_3$ wherein $0 \leq x < 1$ and $0 \leq y < 1$, $Pb(Mg_{1/3}Nb_{2/3})O_3$—$PbTiO_3$, $Li_3PO_4$, $Li_xTi_y(PO_4)_3$ wherein $0 < x < 2$, and $0 < y < 3$, $Li_xAl_yTi_z(PO_4)_3$ wherein $0 < x < 2$, $0 < y < 1$, and $0 < z < 3$, $Li_{1+x+y}(Al_{1-a}Ga_a)_x(Ti_{1-b}Ge_b)_{2-x}Si_yP_{3-y}O_{12}$ wherein $0 \leq x \leq 1$, $0 \leq y \leq 1$, $0 \leq a \leq 1$, and $0 \leq b \leq 1$, $Li_xLa_yTiO_3$ wherein $0 < x < 2$ and $0 < y < 3$, $Li_xGe_yP_zS_w$ wherein $0 < x < 4$, $0 < y < 1$, $0 < z < 1$, and $0 < w < 5$, $Li_xN_y$, wherein $0 < x < 4$ and $0 < y < 2$, $Li_xSi_yS_z$ wherein $0 < x < 3$, $0 < y < 2$, and $0 < z < 4$, $Li_xP_yS_z$ wherein $0 < x < 3$, $0 < y < 3$, and $0 < z < 7$, $LiAlO_2$, a $Li_2O$—$Al_2O_3$—$SiO_2$—$P_2O_5$—$TiO_2$—$GeO_2$ and $Li_{3+x}La_3M_2O_{12}$ wherein $0 \leq x \leq 5$ and M is Te, Nb, or Zr.

12. The charged lithium metal battery of claim 11, wherein the solid ionic conductor comprises at least one selected from the group consisting of $Li_{1.4}Ti_{1.6}Al_{0.4}P_3O_{12}$, $Li_{1.3}Ti_{1.7}Al_{0.3}P_3O_{12}$, $Li_7La_3Zr_2O_{12}$, $Li_5La_3Ta_2O_{12}$, $Li_{0.33}La_{0.55}TiO_3$, $Li_{1/3}La_{1/3}TiO_3$, and $Li_2O$—$Al_2O_3$—$SiO_2$—$P_2O_5$—$TiO_2$—$GeO_2$.

13. The charged lithium metal battery of claim 11, wherein the liquid-impermeable ion-conductive composite membrane is the composite comprising the solid ionic conductor and the non-ionic conductor, wherein the non-ionic conductor comprises a polymer selected from the group consisting of polyvinyl alcohol, polyacrylonitrile, polyimide, epoxy resin, an acrylic resin, polyethylene, polyethylene oxide, polyvinylidene fluoride, polyvinylpyrrolidone, poly 2-vinylpyridine, polytetrafluoroethylene, a tetrafluoroethylene-hexafluoropropylene copolymer, polychlorotrifluoroethylene, a perfluoroalkoxy copolymer, fluorinated cyclic ether, polyethylene oxide diacrylate, polyethylene oxide dimethacrylate, polypropylene oxide diacrylate, polypropylene oxide dimethacrylate, polymethyleneoxide diacrylate, polymethyleneoxide dimethacrylate, poly (C1-C5 alkyldiol) diacrylate, poly (C1-C5 alkyldiol) dimethacrylate, polydivinylbenzene, polyether, polycarbonate, polyamide, polyester, polyvinyl chloride, polycarboxylic acid, polysulfonic acid, polysulfone, polystyrene, polypropylene, poly (p-phenylene), polyacetylene, poly (p-phenylene vinylene), polyaniline, polypyrrole, polythiophene, polyacene, poly (naphthalene-2,6-diyl), polypropylene oxide, a vinylidene fluoride-hexafluoropropylene copolymer, poly (vinyl acetate), poly (vinyl butyral-co-vinyl alcohol-co-vinyl acetate), poly (methyl methacrylate-co-ethyl acrylate), polyvinyl chloride-co-vinyl acetate, poly (1-vinyl pyrrolidone-co-vinyl acetate), polyacrylate, polymethacrylate, polyurethane, polyvinyl ether, an acrylonitrile-butadiene rubber, a styrene-butadiene rubber, an acrylonitrile-butadiene-styrene rubber, a sulfonated styrene/ethylene-butylene triblock copolymer, a polymer obtained from at least one acrylate monomer selected from ethoxylated neopentyl glycol diacrylate, ethoxylated bisphenol A diacrylate, ethoxylated aliphatic urethane acrylate, ethoxylated C1-C5 alkylphenol acrylate, and a C1-C5 alkyl acrylate.

14. The charged lithium metal battery of claim 1, wherein the liquid-impermeable ion-conductive composite membrane has a thickness of about 10 micrometers to about 150 micrometers.

15. The charged lithium metal battery of claim 1, wherein the core of the plurality of connected particles comprise the lithium alloy, wherein the lithium alloy comprises lithium and at least one selected from the group consisting of Si, Sn, Al, Ge, Pb, Bi, and Sb.

16. The charged lithium metal battery of claim 1, wherein the core of the plurality of connected metal particles in the composite electrolyte is about 1part by weight to about 50 parts by weight, with respect to 100 parts by weight of a total weight of the composite electrolyte.

17. The charged lithium metal battery of claim 1, wherein the core of the plurality of connected metal particles is lithium.

18. The charged lithium metal battery of claim 1, further comprising a porous polymer membrane between the composite electrolyte and the liquid-impermeable ion-conductive composite membrane,
wherein the porous polymer membrane comprises at least one selected from the group consisting of a polyethylene membrane, a polypropylene membrane, a polyethylene terephthalate membrane, a polybutylene terephthalate membrane, a polyester membrane, a polyacetal membrane, a polyamide membrane, a polycarbonate membrane, a polyimide membrane, a polyether ketone membrane, a polyether sulfone membrane, a polyphenylene oxide membrane, a polyphenylene sulfide membrane, and a polyethylene naphthalate membrane.

19. The charged lithium metal battery of claim 1, wherein the composite electrolyte further comprises a non-woven fabric to support the plurality of connected metal particles, wherein the non-woven fabric comprises at least one selected from the group consisting of cellulose, polyester, polyetherimide, polyethylene, polypropylene, polyethylene terephthalate, polybutylene terephthalate, polyamide, polyacetal, polycarbonate, polyimide, polyether ketone, polyether sulfone, polyphenylene oxide, polyphenylene sulfide, polyethylene naphthalate, polytetrafluoroethylene, polyvinylidene fluoride, polyvinyl chloride, polyacrylonitrile, nylon, and polyparaphenylene benzobisoxazole.

20. The charged lithium metal battery of claim 1, further comprising a barrier protecting the liquid-impermeable ion-conductive composite membrane, wherein the barrier is on an outer side surface of the liquid-impermeable ion-conductive composite membrane.

21. The charged lithium metal battery of claim 1, wherein the first lithium salt comprises at least one selected from the group consisting of LiSCN, LiN(CN)$_2$, Li(CF$_3$SO$_2$)$_3$C, Li(FSO$_2$)$_2$N, LiC$_4$F$_9$SO$_3$, LiPF$_3$(C$_2$F$_5$)$_3$, LiCl, LiF, LiBr, LiI, LiB(C$_2$O$_4$)$_2$, LiPF$_6$, LiPF$_5$(CF$_3$), LiPF$_5$(C$_2$F$_5$), LiPF$_5$(C$_3$F$_7$), LiPF$_4$(CF$_3$)$_2$, LiPF$_4$(CF$_3$)(C$_2$F$_5$), LiPF$_3$(CF$_3$)$_3$, LiPF$_4$(C$_2$O$_4$)$_2$, LiBF$_4$, LiBF$_3$(C$_2$F$_5$), lithium difluoro(oxalato)borate, lithium bis(trifluoro methanesulfonyl)imide, LiN(SO$_2$CF$_3$)$_2$), lithium bis(fluorosulfonyl)imide, LiN(SO$_2$F)$_2$, LiN(SO$_2$C$_2$F$_5$)$_2$, LiCF$_3$SO$_3$, LiAsF$_6$, LiSbF$_6$, or LiClO$_4$.

22. The charged lithium metal battery of claim 1, wherein the core of the plurality of connected metal particles have a size of about 5 micrometers to about 50 micrometers.

23. The charged lithium metal battery of claim 1, wherein the electrodeposited lithium connecting the metal particles form the interconnected structure layer, the layer having a thickness of about 0.1% about 10% of a thickness of the cathode.

24. The charged lithium metal battery of claim 1, wherein the core of the plurality of connected particles comprise the lithium alloy, wherein the lithium alloy comprises:
lithium and a Si-Y' alloy wherein Y' is at least one of an alkali metal, an alkaline earth metal, a Group 13 to Group 16 element, a transition metal, or a rare earth element, and is not Si; or
lithium and a Sn-Y' alloy wherein Y' is at least one of an alkali metal, an alkaline earth metal, a Group 13 to Group 16 element, a transition metal, or a rare earth element, and is not Sn.

25. A charged lithium metal battery comprising:
a cathode comprising a cathode current collector and a cathode active material layer on the cathode current collector;
an anode current collector, wherein the anode current collector is a mesh current collector;
a composite electrolyte between the cathode and the anode current collector, wherein the composite electrolyte comprises
a first electrolyte comprising a lithium salt and a first organic solvent, and
an interconnected network structure disposed on a surface of the anode current collector, the interconnected network structure comprising a plurality of connected metal particles, each metal particle comprising a core of a lithium metal alloy, and lithium from the lithium salt is electrodeposited on a surface of the core of the metal particles,
wherein the electrodeposited lithium connects the metal particles to form a layer, and
a liquid-impermeable ion-conductive composite membrane disposed between the cathode and the composite electrolyte, wherein the liquid-impermeable ion-conductive composite membrane comprises at least one of a solid ionic conductor or a composite comprising the solid ionic conductor and a non-ionic conductor,
wherein the solid ionic conductor comprises at least one selected from the group consisting of Li$_{1+x}$Ti$_{2-x}$Al$_x$(PO$_4$)$_3$ wherein 0≤x<4, Li$_{1+x+y}$Al$_x$Ti$_{2-x}$Si$_y$P$_{3-y}$O$_{12}$ wherein 0<x<2 and 0≤y<3, BaTiO$_3$, Pb (Zr$_{1-x}$Ti$_x$)O$_3$ wherein 0≤x≤1, Pb$_{1-x}$La$_x$Zr$_{1-y}$Ti$_y$O$_3$ wherein 0≤x<1 and 0≤y<1, Pb (Mg$_{1/3}$Nb$_{2/3}$)O$_3$-PbTiO$_3$, Li$_3$PO$_4$, Li$_x$Ti$_y$(PO$_4$)$_3$ wherein 0<x<2, and 0<y<3, Li$_x$Al$_y$Ti$_z$(PO$_4$)$_3$ wherein 0<x<2, 0<y<1, and 0<z<3, Li$_{1+x+y}$(Al$_{1-a}$Ga$_a$)$_x$(Ti$_{1-b}$Ge$_b$)$_{2-x}$Si$_y$P$_{3-y}$O$_{12}$ wherein 0≤x≤1, 0≤y≤1, 0≤a≤1, and 0≤b≤1, Li$_x$La$_y$TiO$_3$ wherein 0<x<2 and 0<y<3, Li$_x$Ge$_y$P$_z$S$_w$ wherein 0<x<4, 0<y<1, 0<z<1, and 0<w<5, Li$_x$N$_y$, wherein 0<x<4 and 0<y<2, Li$_x$Si$_y$S$_z$ wherein 0<x<3, 0<y<2, and 0<z<4, Li$_x$P$_y$S$_z$ wherein 0<x<3, 0<y<3, and 0<z<7, LiAlO$_2$, a Li$_2$O—Al$_2$O$_3$—SiO$_2$—P$_2$O$_5$—TiO$_2$—GeO$_2$, and Li$_{3+x}$La$_3$M$_2$O$_{12}$ wherein 0≤x≤5 and M is Ta, Nb, or Zr, and the lithium alloy comprises lithium and at least one selected from the group consisting of Si, Sn, Al, Ge, Pb, Bi, and Sb.

26. The charged lithium metal battery of claim 25, wherein the core of the plurality of connected metal particles have a size of about 5 micrometers to about 50 micrometers, and the electrodeposited lithium connecting the metal particles form the interconnected structure layer, the layer having a thickness of about 0.1% about 10% of a thickness of the cathode.

* * * * *